(12) United States Patent
Yoo et al.

(10) Patent No.: US 8,760,503 B2
(45) Date of Patent: Jun. 24, 2014

(54) IMAGE DISPLAY APPARATUS AND OPERATION METHOD THEREFOR

(75) Inventors: Kyung Hee Yoo, Seoul (KR); Sang Jun Koo, Seoul (KR); Sae Hun Jang, Seoul (KR); Uni Young Kim, Seoul (KR); Hyung Nam Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 384 days.

(21) Appl. No.: 12/905,376

(22) Filed: Oct. 15, 2010

(65) Prior Publication Data

US 2011/0109728 A1   May 12, 2011

(30) Foreign Application Priority Data

Nov. 12, 2009 (KR) .................... 10-2009-0109289

(51) Int. Cl.
*H04N 13/04* (2006.01)
*H04N 13/00* (2006.01)

(52) U.S. Cl.
CPC .................... *H04N 13/0011* (2013.01)
USPC .................... 348/51; 348/E13.075

(58) Field of Classification Search
CPC .................... H04N 13/0011
See application file for complete search history.

(56) References Cited

U.S. PATENT DOCUMENTS

| | | | |
|---|---|---|---|
| 5,739,844 A * | 4/1998 | Kuwano et al. | 348/43 |
| 6,243,093 B1 | 6/2001 | Czerwinski et al. | |
| 7,567,987 B2 * | 7/2009 | Shappell et al. | 1/1 |
| 7,581,182 B1 | 8/2009 | Herz | |
| 2002/0080181 A1 * | 6/2002 | Razdow et al. | 345/772 |
| 2004/0239679 A1 | 12/2004 | Ito et al. | |
| 2008/0013860 A1 | 1/2008 | Blanco | |
| 2008/0246757 A1 | 10/2008 | Ito | |

FOREIGN PATENT DOCUMENTS

WO   WO 2007/121557 A1   11/2007

OTHER PUBLICATIONS

"DoFileDownload: Download Files Using IE's Download Dialog", Jan. 15, 2006, XP055073766. Retrieved from the Internet: URL:http://web.archive.org/web/20060427142745/http://vbnet.mvps.org/index.html?code/internet/dofiledownload.htm, [retrieved on Aug. 1, 2013].

* cited by examiner

*Primary Examiner* — Andy Rao
*Assistant Examiner* — Tyler Edwards
(74) *Attorney, Agent, or Firm* — Birch, Stewart, Kolasch & Birch, LLP

(57) ABSTRACT

A method for operating an image display apparatus that receives a three-dimensional (3D) image signal and displays the 3D image signal as a 3D image, includes according to an embodiment displaying an image, detecting a connected external device, receiving data from the detected external device, generating at least one 3D object corresponding to the received data, and displaying the at least one 3D object corresponding to the received data. The at least one 3D object corresponding to the received data is processed to have a different depth from the image.

18 Claims, 33 Drawing Sheets

170

(a)

170

(b)

(a)

(b)

(c)

FIG. 19C
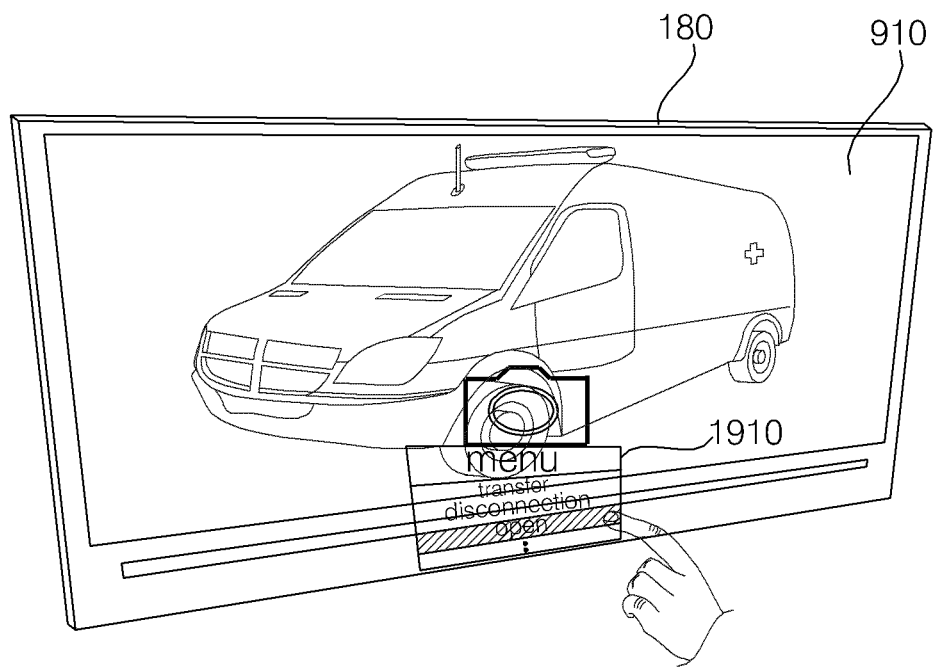
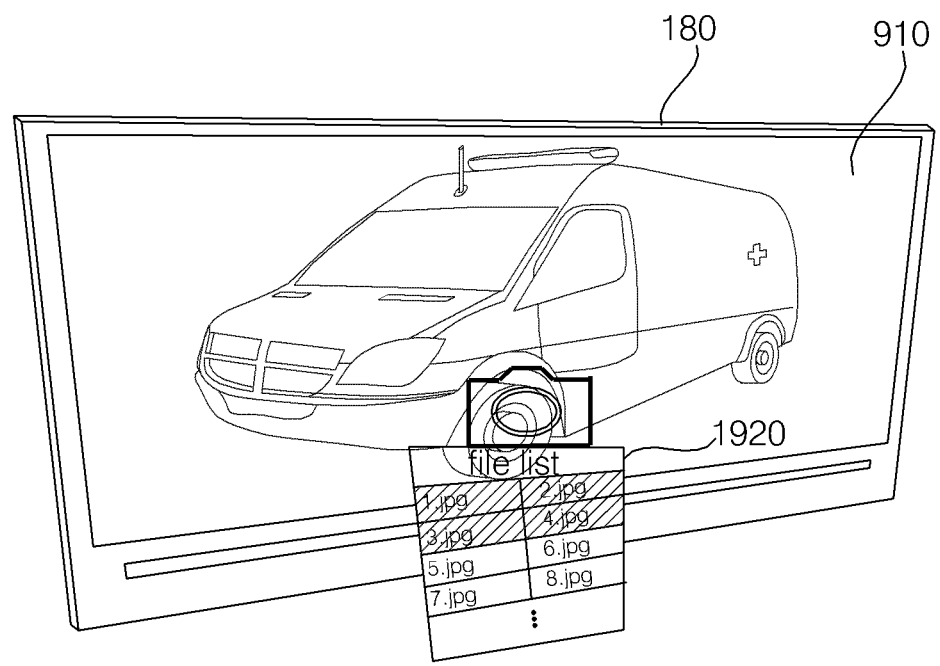
FIG. 19D

FIG. 19E
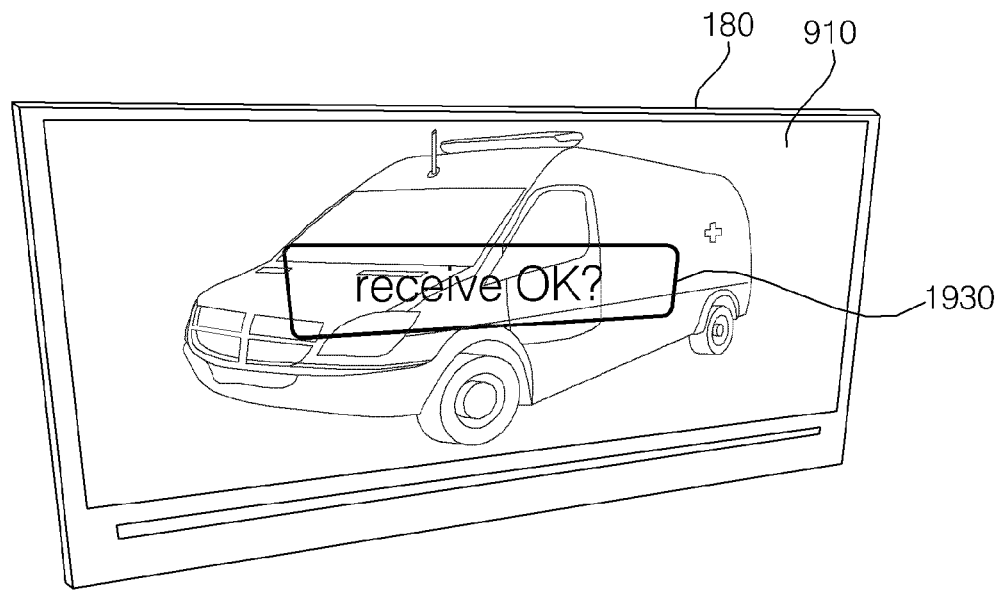
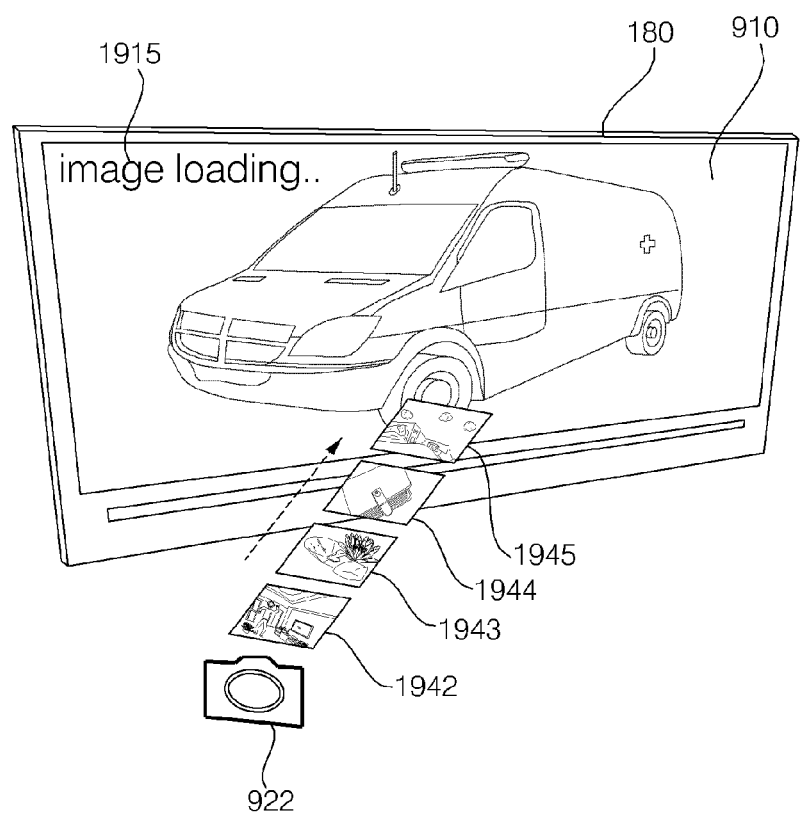
FIG. 19F

US 8,760,503 B2

IMAGE DISPLAY APPARATUS AND OPERATION METHOD THEREFOR

CROSS-REFERENCE TO RELATED APPLICATION

This application claims the priority benefit of Korean Patent Application No. 10-2009-0109289, filed on 12 Nov. 2009, in the Korean Intellectual Property Office, the disclosure of which is incorporated herein by reference.

BACKGROUND OF THE INVENTION

1. Field of the Invention

One or more embodiments described herein relate to an image display apparatus and an operation method therefore, and more particularly, to an image display apparatus and method for displaying a three-dimensional (3D) image.

2. Discussion of the Background Art

An image display apparatus has a function of displaying images viewable to a user. The image display apparatus may display a broadcasting program selected by the user on a display from among broadcasting programs transmitted from broadcasting stations, or may display locally recorded programs and images. The recent trend in broadcasting is a worldwide shift from analog broadcasting to digital broadcasting.

By transmitting digital audio and video signals, digital broadcasting offers many advantages over analog broadcasting such as robustness against noise, less data loss, ease of error correction, and the ability to provide high-definition, clear images. Digital broadcasting also has allowed interactive services for viewers.

Recently, many studies have been conducted on 3D images, and 3D image techniques are getting popular and finding their applications in a wide range of environments and technologies. Also in the digital broadcasting industry, apparatuses for transmitting and reproducing 3D images are under development.

DETAILED DESCRIPTION

Exemplary embodiments of the present invention will be described below with reference to the attached drawings.

The terms "module" and "portion" attached to describe the names of components are used herein to help the understanding of the components and thus they should not be considered as having specific meanings or roles. Accordingly, the terms "module" and "portion" may be interchangeable in their use.

Figure 1:
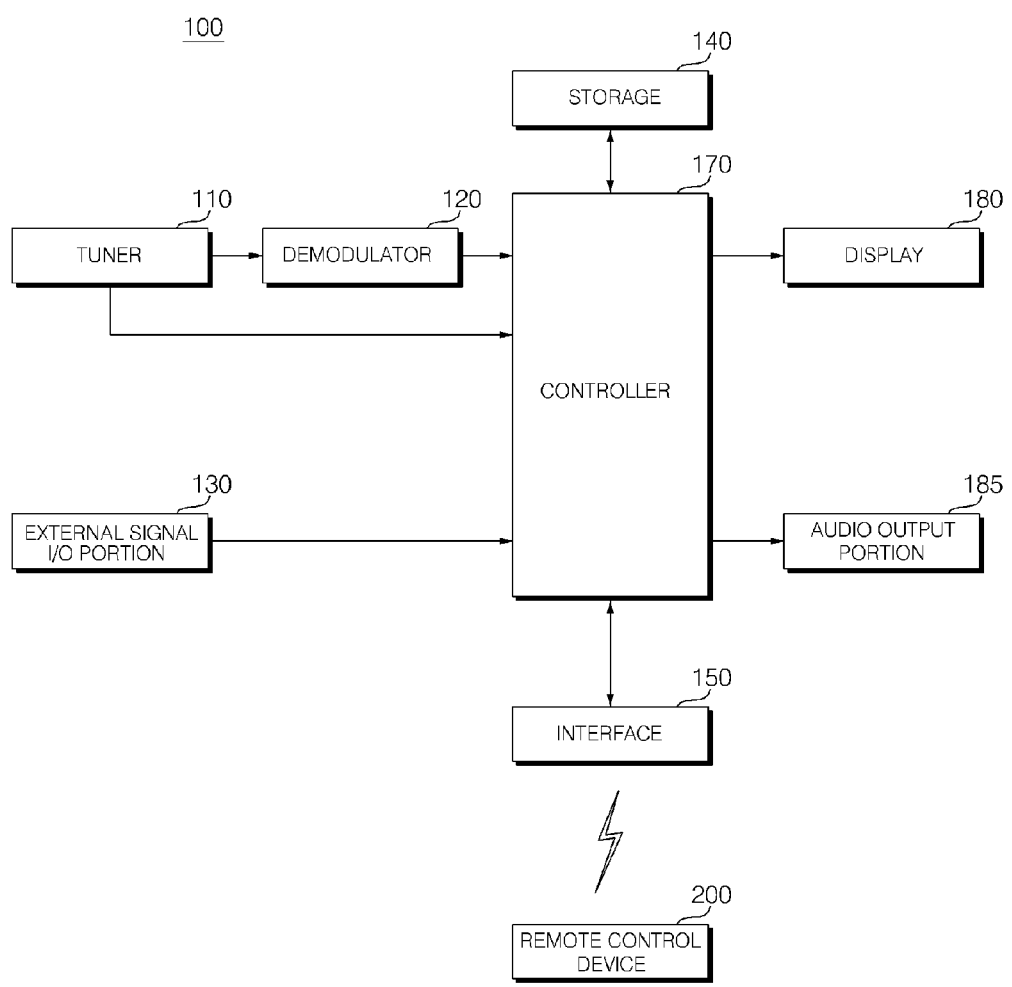
FIG. 1 illustrates a block diagram of an image display apparatus according to an exemplary embodiment of the present invention.

FIG. 1 illustrates a block diagram of an image display apparatus 100 according to an exemplary embodiment of the present invention. Referring to FIG. 1, the image display apparatus 100 may include a tuner 110, a demodulator 120, an external signal input/output (I/O) portion 130, a storage 140, an interface 150, a sensing portion (not shown), a controller 170, a display 180, and an audio output portion 185.

The tuner 110 may select a radio frequency (RF) broadcast signal corresponding to a channel selected by a user or an RF broadcast signal corresponding to a previously-stored channel from a plurality of RF broadcast signals received via an antenna and may convert the selected RF broadcast signal into an intermediate-frequency (IF) signal or a baseband audio/video (A/V) signal. More specifically, if the selected RF broadcast signal is a digital broadcast signal, the tuner 110 may convert the selected RF broadcast signal into a digital IF signal (DIF). On the other hand, if the selected RF broadcast signal is an analog broadcast signal, the tuner 110 may convert the selected RF broadcast signal into an analog baseband A/V signal CVBS/SIF. That is, the tuner 110 can process both digital broadcast signals and analog broadcast signals. The analog baseband A/V signal CVBS/SIF may be directly transmitted to the controller 170.

The tuner 110 may be able to receive RF broadcast signals from an Advanced Television Systems Committee (ATSC) single-carrier system or from a Digital Video Broadcasting (DVB) multi-carrier system.

The tuner 110 may sequentially select a number of RF broadcast signals respectively corresponding to a number of channels previously added to the image display apparatus 100 by a channel-add function from a plurality of RF signals received through the antenna, and may convert the selected RF broadcast signals into IF signals or baseband A/V signals in order to display a thumbnail list including a plurality of thumbnail images on the display 180. Thus, the tuner 110 can receive RF broadcast signals sequentially or periodically not only from the selected channel but also from a previously-stored channel.

The demodulator 120 may receive the DIF from the tuner 110 and may demodulate the DIF.

More specifically, if the DIF is, for example, an ATSC signal, the demodulator 120 may perform 8-Vestigal Side-Band (VSB) demodulation on the DIF. The demodulator 120 may perform channel decoding. For this, the demodulator 120 may include a Trellis decoder (not shown), a de-interleaver (not shown) and a Reed-Solomon decoder (not shown) and may thus be able to perform Trellis decoding, de-interleaving and Reed-Solomon decoding.

On the other hand, if the DIF is, for example, a DVB signal, the demodulator 120 may perform coded orthogonal frequency division modulation (COFDMA) demodulation on the DIF. The demodulator 120 may perform channel decoding. For this, the demodulator 120 may include a convolution decoder (not shown), a de-interleaver (not shown), and a Reed-Solomon decoder (not shown) and may thus be able to perform convolution decoding, de-interleaving and Reed-Solomon decoding.

The demodulator 120 may perform demodulation and channel decoding on the DIF, thereby providing a stream signal TS into which a video signal, an audio signal and/or a data signal are multiplexed. The stream signal TS may be an MPEG-2 (Moving Picture Expert Group) transport stream into which an MPEG-2 video signal and a Dolby AC-3 (Arc Consistency Algorithm #3) audio signal are multiplexed. An MPEG-2 transport stream may include a 4-byte header and a 184-byte payload.

The demodulator 120 may include an ATSC demodulator for demodulating an ATSC signal and a DVB demodulator for demodulating a DVB signal.

The stream signal TS may be transmitted to the controller 170. The controller 170 may perform demultiplexing and signal processing on the stream signal TS, thereby outputting video data and audio data to the display 180 and the audio output portion 185, respectively.

The external signal I/O portion 130 may connect the image display apparatus 100 to an external device. For this, the external signal I/O portion 130 may include an A/V I/O module or a wireless communication module.

The external signal I/O portion 130 may be connected to an external device such as a digital versatile disc (DVD), a Blu-ray disc, a game console, a camera, a camcorder, or a computer (e.g., a laptop computer) either non-wirelessly or wirelessly. Then, the external signal I/O portion 130 may receive various video, audio and data signals from the external device and may transmit the received signals to the controller 170. In addition, the external signal I/O portion 130 may output various video, audio and data signals processed by the controller 170 to the external device.

In order to transmit A/V signals from an external device to the image display apparatus 100, the A/V I/O module of the external signal I/O portion 130 may include an Ethernet port, a universal serial bus (USB) port, a composite video banking sync (CVBS) port, a component port, a super-video (S-video) (analog) port, a digital visual interface (DVI) port, a high-definition multimedia interface (HDMI) port, a red-green-blue (RGB) port, a D-sub port, an Institute of Electrical and Electronics Engineers (IEEE)-1394 port, a Sony/Philips Digital Interconnect Format (S/PDIF) port, and a LiquidHD port.

The wireless communication module of the external signal I/O portion 130 may wirelessly access the internet, i.e., may allow the image display apparatus 100 to access a wireless internet connection. For this, the wireless communication module may use various communication standards such as a wireless local area network (WLAN) (i.e., Wi-Fi), Wireless broadband (Wibro), World Interoperability for Microwave Access (Wimax), or High Speed Downlink Packet Access (HSDPA).

In addition, the wireless communication module may perform short-range wireless communication with other electronic devices. The image display apparatus 100 may be networked with other electronic devices using various communication standards such as Bluetooth, radio-frequency identification (RFID), Infrared Data Association (IrDA), Ultra Wideband (UWB), or ZigBee.

The external signal I/O portion 130 may be connected to various set-top boxes through at least one of the Ethernet port, the USB port, the CVBS port, the component port, the S-video port, the DVI port, the HDMI port, the RGB port, the D-sub port, the IEEE-1394 port, the S/PDIF port, and the liquidHD port and may thus receive data from or transmit data to the various set-top boxes. For example, when connected to an Internet Protocol Television (IPTV) set-top box, the external signal I/O portion 130 may transmit video, audio and data signals processed by the IPTV set-top box to the controller 170 and may transmit various signals provided the controller 170 to the IPTV set-top box. In addition, video, audio and data signals processed by the IPTV set-top box may be processed by the channel-browsing processor (not shown) and then the controller 170.

The term 'IPTV', as used herein, may cover a broad range of services such as ADSL-TV, VDSL-TV, MH-TV, TV over DSL, Video over DSL, TV over IP (TVIP), Broadband TV (BTV), and Internet TV and full-browsing TV, which are capable of providing Internet-access services.

The external signal I/O portion 130 may be connected to a communication network so as to be provided with a video or voice call service. Examples of the communication network include a broadcast communication network, a public switched telephone network (PTSN), and a mobile communication network.

The storage 140 may store various programs necessary for the controller 170 to process and control signals. The storage 140 may also store video, audio and/or data signals processed by the controller 170.

The storage 140 may temporarily store video, audio and/or data signals received by the external signal I/O portion 130. In addition, the storage 140 may store information regarding a broadcast channel with the aid of a channel add function.

The storage 140 may include at least one of a flash memory-type storage medium, a hard disc-type storage medium, a multimedia card micro-type storage medium, a card-type memory (such as a secure digital (SD) or extreme digital (XD) memory), a random access memory (RAM), and a read-only memory (ROM) (such as an electrically erasable programmable ROM (EEPROM)). The image display apparatus 100 may play various files (such as a moving image file, a still image file, an audio file or a document file) in the storage 140 for a user.

The storage 140 is illustrated in FIG. 1 as being separate from the controller 170, but the present invention is not restricted to this. That is, the storage 140 may be included in the controller 170.

The interface 150 may transmit a signal input thereto by a user to the controller 170 or transmit a signal provided by the controller 170 to a user. For example, the interface 150 may receive various user input signals such as a power-on/off signal, a channel-selection signal, and a channel-setting signal from a remote control device 200 or may transmit a signal provided by the controller 170 to the remote control device 200. The sensing portion may allow a user to input various user commands to the image display apparatus 100 without the need to use the remote control device 200.

The controller 170 may demultiplex an input stream provided thereto via the tuner 110 and the demodulator 120 or via the external signal I/O portion 130 into a number of signals and may process the demultiplexed signals so that the processed signals can be output A/V data. The controller 170 may control the general operation of the image display apparatus 100.

The controller 170 may control the image display apparatus 100 in accordance with a user command input thereto via the interface 150 or the sensing portion or a program present in the image display apparatus 100.

The controller 170 may include a demultiplexer (not shown), a image processor (not shown), an audio processor (not shown), and an OSD generator (not shown).

The controller 170 may control the tuner 110 to tune to select an RF broadcast program corresponding to a channel selected by a user or a previously-stored channel.

The controller 170 may demultiplex an input stream signal, e.g., an MPEG-2 TS signal, into a video signal, an audio signal and a data signal. The input stream signal may be a stream signal output by the tuner 110, the demodulator 120 or the external signal I/O portion 130.

The controller 170 may process the video signal. More specifically, the controller 170 may decode the video signal using different decoder according to whether the video signal includes a 2D image signal and a 3D image signal, includes a 2D image signal only or includes a 3D image signal only. It will be described later in further detail how the controller 170 processes a 2D image signal or a 3D image signal with reference to FIG. 3.

In addition, the controller 170 may adjust the brightness, tint and color of the video signal.

The processed video signal provided by the controller 170 may be transmitted to the display 180 and may thus be displayed by the display 180. Then, the display 180 may display an image corresponding to the processed video signal provided by the controller 170. The processed video signal provided by the controller 170 may also be transmitted to an external output device via the external signal I/O portion 130.

The controller 170 may process the audio signal obtained by demultiplexing the input stream signal. For example, if the audio signal is an encoded signal, the controller 170 may decode the audio signal. More specifically, if the audio signal is an MPEG-2 encoded signal, the controller 170 may decode the audio signal by performing MPEG-2 decoding. On the other hand, if the audio signal is an MPEG-4 Bit Sliced Arithmetic Coding (BSAC)-encoded terrestrial DMB signal, the controller 170 may decode the audio signal by performing MPEG-4 decoding. On the other hand, if the audio signal is an MPEG-2 Advanced Audio Coding (AAC)-encoded DMB or DVB-H signal, the controller 180 may decode the audio signal by performing AAC decoding.

In addition, the controller 170 may adjust the base, treble or sound volume of the audio signal.

The processed audio signal provided by the controller 170 may be transmitted to the audio output portion 185. The processed audio signal provided by the controller 170 may also be transmitted to an external output device via the external signal I/O portion 130.

The controller 170 may process the data signal obtained by demultiplexing the input stream signal. For example, if the data signal is an encoded signal such as an electronic program guide (EPG), which is a guide to scheduled broadcast TV or radio programs, the controller 170 may decode the data signal. Examples of an EPG include ATSC-Program and System Information Protocol (PST) information and DVB-Service Information (SI). ATSC-PSIP information or DVB-SI information may be included in the header of a TS, e.g., a 4-byte header of an MPEG-2 TS.

The controller 170 may perform on-screen display (OSD) processing. More specifically, the controller 170 may generate an OSD signal for displaying various information on the display device 180 as graphic or text data based on a user input signal provided by the remote control device 200 or at least one of a processed video signal and a processed data signal. The OSD signal may be transmitted to the display 180 along with the processed video signal and the processed data signal.

The OSD signal may include various data such as a user-interface (UI) screen for the image display apparatus 100 and various menu screens, widgets, and icons.

Figure 3:
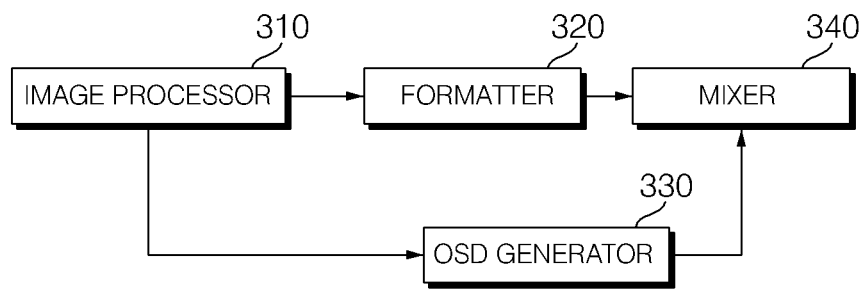
FIGS. 3(a) and 3(b) illustrate block diagrams of a controller shown in FIG. 1.
Figure 3:
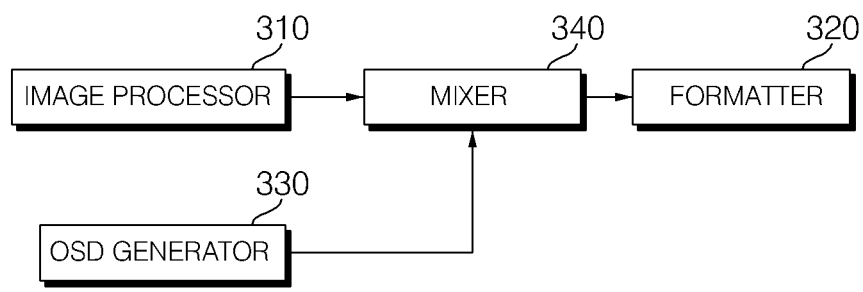

The controller 170 may generate the OSD signal as a 2D image signal or a 3D image signal, and this will be described later in further detail with reference to FIG. 3.

The controller 170 may receive the analog baseband A/V signal CVBS/SIF from the tuner 110 or the external signal I/O portion 130. An analog baseband video signal processed by the controller 170 may be transmitted to the display 180, and may then be displayed by the display 180. On the other hand, an analog baseband audio signal processed by the controller 170 may be transmitted to the audio output portion 185 (e.g., a speaker) and may then be output through the audio output portion 185.

The image display apparatus 100 may also include a channel-browsing processor (not shown) which generates a thumbnail image corresponding to a channel signal or an externally-input signal. The channel-browsing processor may receive the stream signal TS from the demodulator 120 or the external signal I/O portion 130, may extract an image from the stream signal TS, and may generate a thumbnail image based on the extracted image. The thumbnail image generated by the channel-browsing processor may be transmitted to the controller 170 as it is without being encoded. Alternatively, the thumbnail image generated by the channel-browsing processor may be encoded, and the encoded thumbnail image may be transmitted to the controller 170. The controller 170 may display a thumbnail list including a number of thumbnail images input thereto on the display 180.

The controller 170 may receive a signal from the remote control device 200 via the interface 150. Thereafter, the controller 170 may identify a command input to the remote control device 200 by a user based on the received signal, and may control the image display apparatus 100 in accordance with the identified command. For example, if a user inputs a command to select a predetermined channel, the controller 170 may control the tuner 110 to receive a video signal, an audio signal and/or a data signal from the predetermined channel, and may process the signal(s) received by the tuner 110. Thereafter, the controller 170 may control channel information regarding the predetermined channel to be output through the display 180 or the audio output portion 185 along with the processed signal(s).

A user may input a command to display various types of A/V signals to the image display apparatus 100. If a user wishes to watch a camera or camcorder image signal received by the external signal I/O portion 130, instead of a broadcast signal, the controller 170 may control a video signal or an audio signal to be output via the display 180 or the audio output portion 185.

The controller 170 may identify a user command input to the image display apparatus 100 via a number of local keys, which is included in the sensing portion, and may control the image display apparatus 100 in accordance with the identified user command. For example, a user may input various commands such as a command to turn on or off the image display apparatus 100, a command to switch channels, or a command to change volume to the image display apparatus 100 using the local keys. The local keys may include buttons or keys provided at the image display apparatus 100. The controller 170 may determine how the local keys have been manipulated by a user, and may control the image display apparatus 100 according to the results of the determination.

The display 180 may convert a processed video signal, a processed data signal, and an OSD signal provided by the controller 170 or a video signal and a data signal provided by the external signal I/O portion 130 into RGB signals, thereby generating driving signals. The display 180 may be implemented into various types of displays such as a plasma display panel, a liquid crystal display (LCD), an organic light-emitting diode (OLED), and a flexible display. Specially, the display 180 may be implemented into a three-dimensional (3D) display.

The display 180 may be classified into an additional display or an independent display. The independent display is a display device capable of displaying a 3D image without a requirement of additional display equipment such as glasses. Examples of the independent display include a lenticular display and parallax bather display. On the other hand, the additional display is a display device capable of displaying a 3D image with the aid of additional display equipment. Examples of the additional display include a head mounted display (HMD) and an eyewear display (such as a polarized glass-type display, a shutter glass display, or a spectrum filter-type display).

The display 180 may also be implemented as a touch screen and may thus be used not only as an output device but also as an input device.

The audio output portion 185 may receive a processed audio signal (e.g., a stereo signal, a 3.1-channel signal or a 5.1-channel signal) from the controller 170 and may output the received audio signal. The audio output portion 185 may be implemented into various types of speakers.

The remote control device 200 may transmit a user input to the interface 150. For this, the remote control device 200 may use various communication techniques such as Bluetooth, RF, IR, UWB and ZigBee.

The remote control device 100 may receive a video signal, an audio signal or a data signal from the interface 150, and may output the received signal.

The image display apparatus 100 may also include the sensing portion. The sensing portion may include a touch sensor, an acoustic sensor, or a position sensor.

The touch sensor may be a touch screen of the display 180. The touch sensor may sense where on the touch screen and with what intensity a user is touching. The acoustic sensor may sense the voice of a user various sounds generated by a user. The position sensor may sense the position of a user. The motion sensor may sense a gesture generated by a user. The position sensor or the motion sensor may include an infrared detection sensor or camera, and may sense the distance between the image display apparatus 100 and a user, and any hand gestures made by the user.

The sensing portion may transmit various sensing results provided by the touch sensor, the acoustic sensor, the position sensor and the motion sensor to a sensing signal processor (not shown). Alternatively, the sensing portion may analyze the various sensing results, and may generate a sensing signal based on the results of the analysis. Thereafter, the sensing portion may provide the sensing signal to the controller 170.

The sensing signal processor may process the sensing signal provided by the sensing portion, and may transmit the processed sensing signal to the controller 170.

The image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display apparatus 100 may be a digital broadcast receiver capable of receiving cable broadcast programs, satellite broadcast programs or IPTV programs.

Examples of the image display apparatus 100 include a TV receiver, a mobile phone, a smart phone, a laptop computer, a digital broadcast receiver, a personal digital assistant (PDA) and a portable multimedia player (PMP).

The structure of the image display apparatus 100 shown in FIG. 1 is exemplary. The elements of the image display apparatus 100 may be incorporated into fewer modules, new elements may be added to the image display apparatus 100 or some of the elements of the image display apparatus 100 may not be provided. That is, two or more of the elements of the image display apparatus 100 may be incorporated into a single module, or some of the elements of the image display apparatus 100 may each be divided into two or more smaller portions. The functions of the elements of the image display apparatus 100 are also exemplary, and thus do not put any restrictions on the scope of the present invention.

Figure 2:
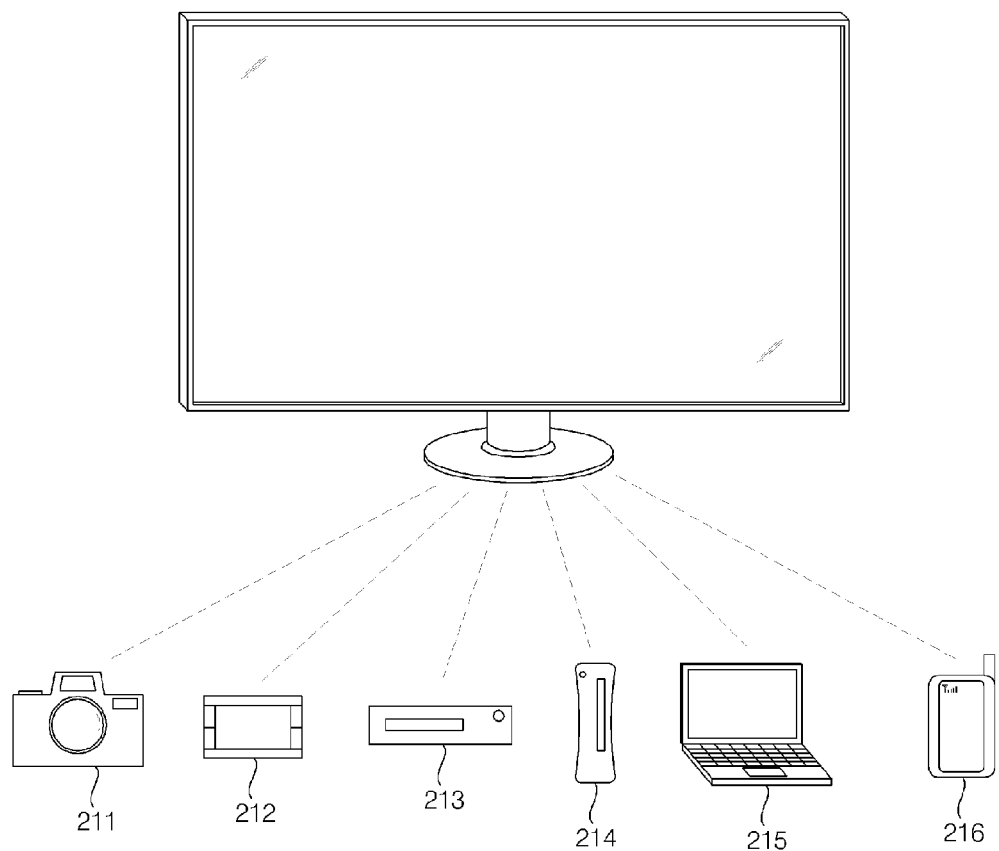
FIG. 2 illustrates various types of external devices that can be connected to the image display apparatus shown in FIG. 1.

FIG. 2 illustrates examples of an external device that can be connected to the image display apparatus 100. Referring to FIG. 3, the image display apparatus 100 may be connected either non-wirelessly or wirelessly to an external device via the external signal I/O portion 130.

Examples of the external device to which the image display apparatus 100 may be connected include a camera 211, a screen-type remote control device 212, a set-top box 213, a game console 214, a computer 215 and a mobile communication terminal 216.

When connected to an external device via the external signal I/O portion 130, the image display apparatus 100 may display a graphic user interface (GUI) screen provided by the external device on the display 180. Then, a user may access both the external device and the image display apparatus 100 and may thus be able to view video data currently being played by the external device or video data present in the external device from the image display apparatus 100. In addition, the image display apparatus 100 may output audio data currently being played by the external device or audio data present in the external device via the audio output portion 185.

Various data, for example, still image files, moving image files, audio files or text files, present in an external device to which the image display apparatus 100 is connected via the external signal I/O portion 130 may be stored in the storage 140 of the image display apparatus 100. In this case, even after disconnected from the external device, the image display apparatus 100 can output the various data stored in the storage 140 via the display 180 or the audio output portion 185.

When connected to the mobile communication terminal 216 or a communication network via the external signal I/O portion 130, the image display apparatus 100 may display a screen for providing a video or voice call service on the display 180 or may output audio data associated with the provision of the video or voice call service via the audio output portion 185. Thus, a user may be allowed to make or receive a video or voice call with the image display apparatus 100, which is connected to the mobile communication terminal 216 or a communication network.

Figure 5:
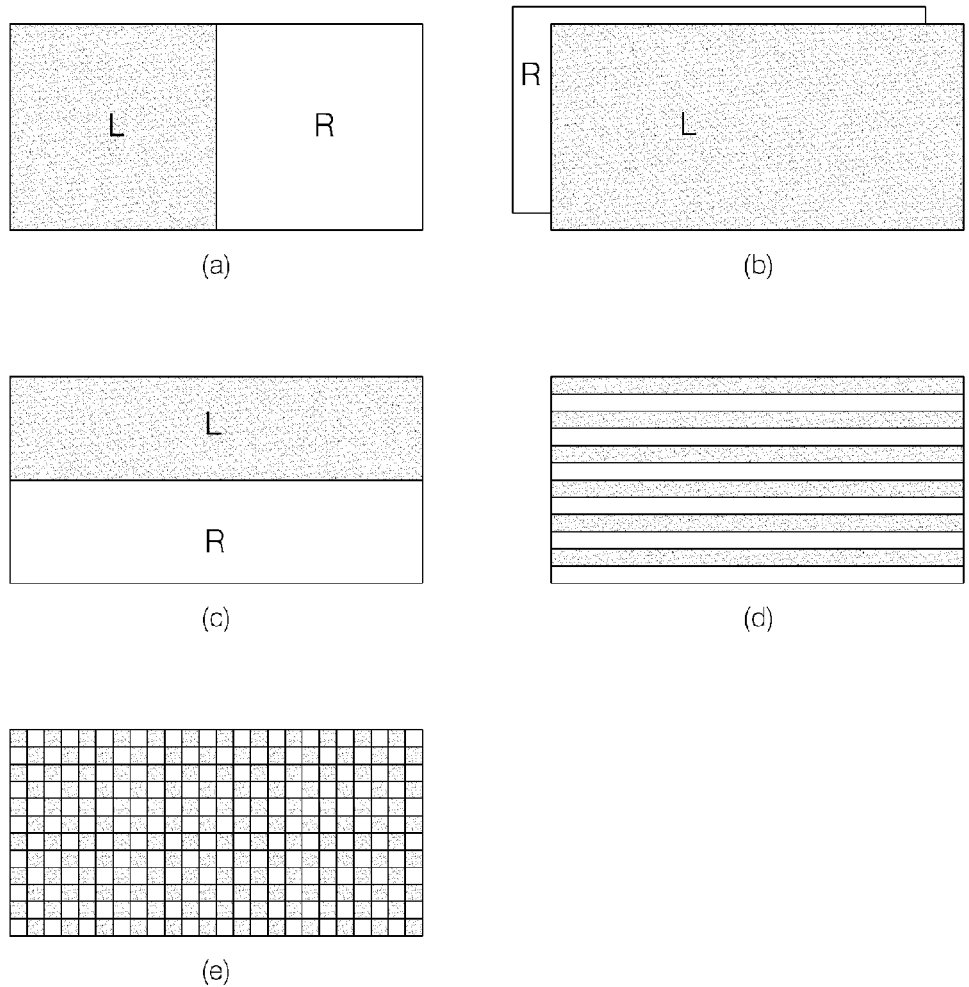
FIGS. 5(a) through 5(e) illustrate various 3D image formats provided by the formatter shown in FIG. 3.
Figure 6:
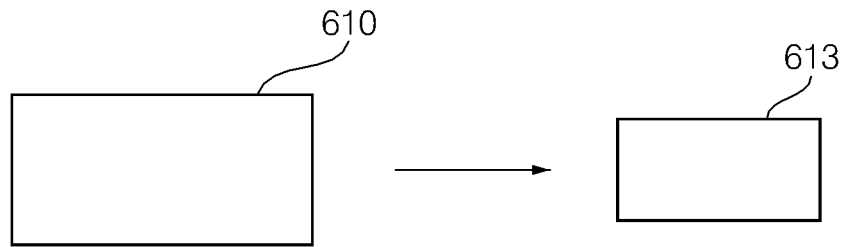
FIGS. 6(a) through 6(c) illustrate how the formatter shown in FIG. 3 scales a 3D image.
Figure 6:
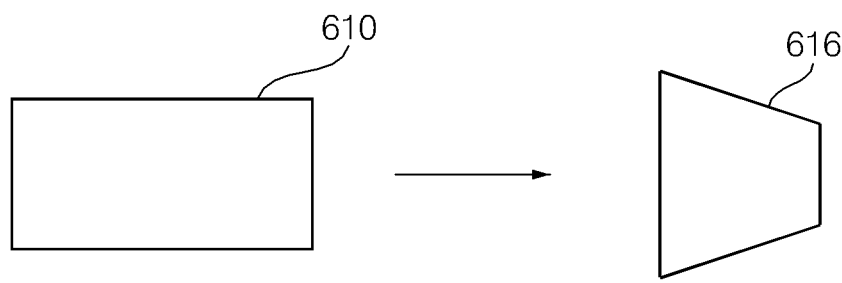
Figure 6:
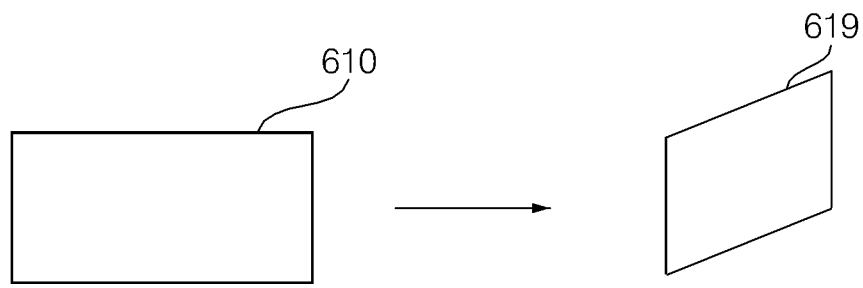

FIGS. 3(a) and 3(b) illustrate block diagrams of the controller 170, FIGS. 4(a) through 4(g) illustrate how a formatter 320 shown in FIG. 3(a) or 3(b) separates a 2-dimensional (2D) image signal and a 3-dimensional (3D) image signal, FIGS. 5(a) through 5(e) illustrate various examples of the format of a 3D image output by the formatter 320, and FIGS. 6(a) through 6(c) illustrate how to scale a 3D image output by the formatter 320.

Referring to FIG. 3(a), the controller 170 may include an image processor 310, the formatter 320, an on-screen display (OSD) generator 330 and a mixer 340.

Referring to FIG. 3(a), the image processor 310 may decode an input image signal, and may provide the decoded image signal to the formatter 320. Then, the formatter 320 may process the decoded image signal provided by the image processor 310 and may thus provide a plurality of view image signals. The mixer 340 may mix the plurality of view image signals provided by the formatter 320 and an image signal provided by the OSD generator 330.

More specifically, the image processor 310 may process both a broadcast signal processed by the tuner 110 and the demodulator 120 and an externally input signal provided by the external signal I/O portion 130.

The input image signal may be a signal obtained by demultiplexing a stream signal.

If the input image signal is, for example, an MPEG-2-encoded 2D image signal, the input image signal may be decoded by an MPEG-2 decoder.

On the other hand, if the input image signal is, for example, an H.264-encoded 2D image signal according to DMB or DVB-H, the input image signal may be decoded by an H.264 decoder.

On the other hand, if the input image signal is, for example, an MPEG-C part 3 image with disparity information and depth information, not only the input image signal but also the disparity information and depth information may be decoded by an MPEG-C decoder.

On the other hand, if the input image signal is, for example, a Multi-View Video Coding (MVC) image, the input image signal may be decoded by an MVC decoder.

On the other hand, if the input image signal is, for example, a free viewpoint TV (FTV) image, the input image signal may be decoded by an FTV decoder.

The decoded image signal provided by the image processor 310 may include a 2D image signal only, include both a 2D image signal and a 3D image signal or include a 3D image signal only.

The decoded image signal provided by the image processor 310 may be a 3D image signal with various formats. For example, the decoded image signal provided by the image processor 310 may be a 3D image including a color image and a depth image or a 3D image including a plurality of view image signals. The plurality of view image signals may include a left-eye view image signal L and a right-eye view image signal R. The left-eye view image signal L and the right-eye view image signal R may be arranged in various formats such as a side-by-side format shown in FIG. 5(a), a frame sequential format shown in FIG. 5(b), a top-down format shown in FIG. 5(c), an interlaced format shown in FIG. 5(d), or a checker box format shown in FIG. 5(e).

If the input image signal includes caption data or an image signal associated with data broadcasting, the image processor 310 may separate the caption data or the image signal associated with data broadcasting from the input image signal and may output the caption data or the image signal associated with data broadcasting to the OSD generator 330. Then, the OSD generator 330 may generate 3D objects based on the caption data or the image signal associated with data broadcasting.

The formatter 320 may receive the decoded image signal provided by the image processor 310, and may separate a 2D image signal and a 3D image signal from the received decoded image signal. The formatter 320 may divide a 3D image signal into a plurality of view signals, for example, a left-eye view image signal and a right-eye view image signal.

It may be determined whether the decoded image signal provided by the image processor 310 is a 2D image signal or a 3D image signal based on whether a 3D image flag, 3D image metadata, or 3D image format information is included in the header of a corresponding stream.

The 3D image flag, the 3D image metadata or the 3D image format information may include not only information regarding a 3D image but also location information, region information or size information of the 3D image. The 3D image flag, the 3D image metadata or the 3D image format information may be decoded, and the decoded 3D image flag, the decoded image metadata or the decoded 3D image format information may be transmitted to the formatter 320 during the demultiplexing of the corresponding stream.

The formatter 320 may separate a 3D image signal from the decoded image signal provided by the image processor 310 based on the 3D image flag, the 3D image metadata or the 3D image format information. The formatter 320 may divide the 3D image signal into a plurality of view image signals with reference to the 3D image format information. For example, the formatter 320 may divide the 3D image signal into a left-eye view image signal and a right-eye view image signal based on the 3D image format information.

Referring to FIGS. 4(a) through 4(g), the formatter 320 may separate a 2D image signal and a 3D image signal from the decoded image signal provided by the image processor 310 and may then divide the 3D image signal into a left-eye view image signal and a right-eye view image signal.

Figure 4:
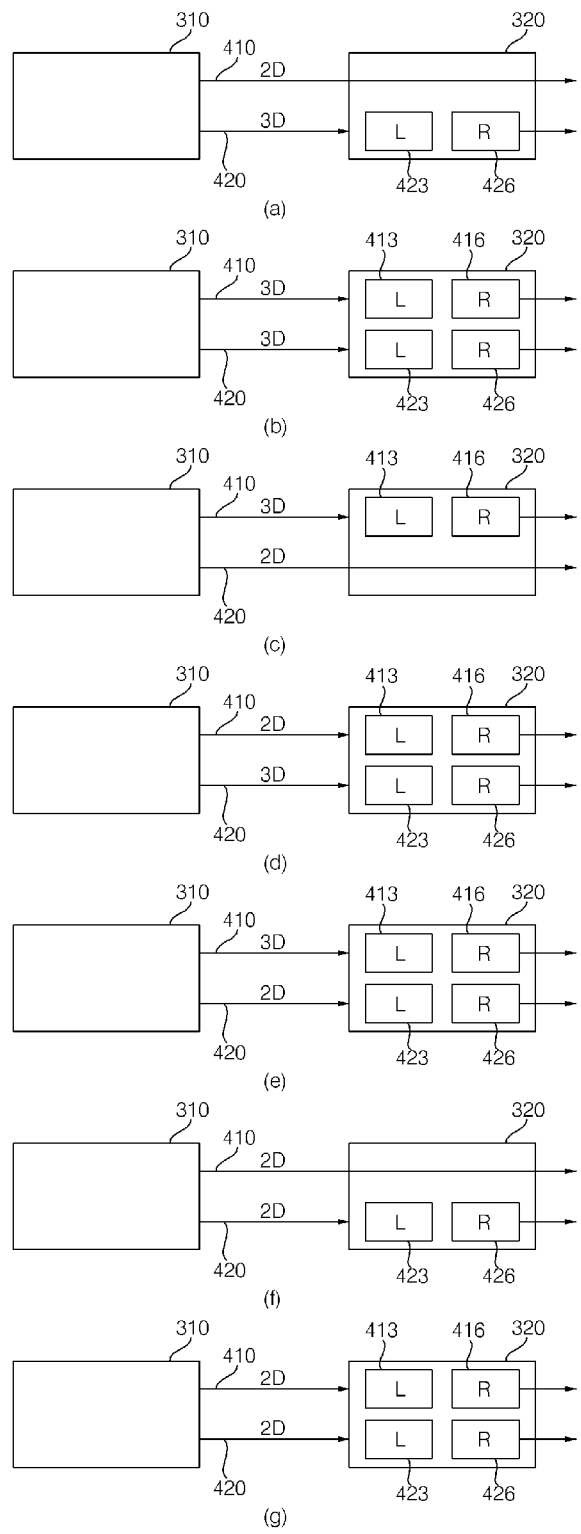
FIGS. 4(a) through 4(g) illustrate how a formatter shown in FIG. 3 separates a two-dimensional (2D) image signal and a three-dimensional (3D) image signal.

More specifically, referring to FIG. 4(a), if a first image signal 410 is a 2D image signal and a second image signal 420 is a 3D image signal, the formatter 320 may separate the first and second image signals 410 and 420 from each other, and may divide the second image signal 420 into a left-eye view image signal 423 and a right-eye view image signal 426. The first image signal 410 may correspond to a main image to be displayed on the display 180, and the second image signal 420 may correspond to a picture-in-picture (PIP) image to be displayed on the display 180.

Referring to FIG. 4(b), if the first and second image signals 410 and 420 are both 3D image signals, the formatter 320 may separate the first and second image signals 410 and 420 from each other, may divide the first image signal 410 into a left-eye view image signal 413 and a right-eye view image signal 416, and may divide the second image signal 420 into the left-eye view image signal 423 and the right-eye view image signal 426.

Referring to FIG. 4(c), if the first image signal 410 is a 3D image signal and the second image signal 420 is a 2D image signal, the formatter 320 may divide the first image signal into the left-eye view image signal 413 and the right-eye view image signal 416.

Referring to FIGS. 4(d) and 4(e), if one of the first and second image signals 410 and 420 is a 3D image signal and the other image signal is a 2D image signal, the formatter 320 may convert whichever of the first and second image signals 410 and 420 is a 2D image signal into a 3D image signal in response to, for example, user input. More specifically, the formatter 320 may convert a 2D image signal into a 3D image signal by detecting edges from the 2D image signal using a 3D image creation algorithm, extracting an object with the detected edges from the 2D image signal, and generating a 3D image signal based on the extracted object. Alternatively, the formatter 320 may convert a 2D image signal into a 3D image signal by detecting an object, if any, from the 2D image signal using a 3D image process algorithm and generating a 3D image signal based on the detected object. Once a 2D image signal is converted into a 3D image signal, the formatter 320 may divide the 3D image signal into a left-eye view image signal and a right-eye view image signal. A 2D image signal except for an object to be reconstructed as a 3D image signal may be output as a 2D image signal.

Referring to FIG. 4(f), if the first and second image signals 410 and 420 are both 2D image signals, the formatter 320 may convert only one of the first and second image signals 410 and 420 into a 3D image signal using a 3D image process algorithm. Alternatively, referring to FIG. 4G, the formatter 320 may convert both the first and second image signals 410 and 420 into 3D image signals using a 3D image process algorithm.

If there is a 3D image flag, 3D image metadata or 3D image format information available, the formatter 320 may determine whether the decoded image signal provided by the image processor 310 is a 3D image signal with reference to the 3D image flag, the 3D image metadata or the 3D image format information. On the other hand, if there is no 3D image flag, 3D image metadata or 3D image format information available, the formatter 320 may determine whether the decoded image signal provided by the image processor 310 is a 3D image signal by using a 3D image process algorithm.

A 3D image signal provided by the image processor 310 may be divided into a left-eye view image signal and a right-eye view image signal by the formatter 320. Thereafter, the left-eye view image signal and the right-eye view image signal may be output in one of the formats shown in FIGS. 5(a) through 5(e). A 2D image signal provided by the image processor 310, however, may be output as is without the need to be processed or may be transformed and thus output as a 3D image signal.

As described above, the formatter 320 may output a 3D image signal in various formats. More specifically, referring to FIGS. 5(a) through 5(e), the formatter 320 may output a 3D image signal in a side-by-side format, a frame sequential format, a top-down format, an interlaced format, in which a left-eye view image signal and a right-eye view image signal are mixed on a line-by-line basis, or a checker box format, in which a left-eye view image signal and a right-eye view image signal are mixed on a box-by-box basis.

A user may select one of the formats shown in FIGS. 5(a) through 5(e) as an output format for a 3D image signal. For example, if a user selects the top-down format, the formatter 320 may reconfigure a 3D image signal input thereto, divide the input 3D image signal into a left-eye view image signal and a right-eye view image signal, and output the left-eye view image signal and the right-eye view image signal in the top-down format regardless of the original format of the input 3D image signal.

A 3D image signal input to the formatter 320 may be a broadcast image signal, an externally-input signal or a plurality of view image signal with a predetermined depth. The formatter 320 may divide the 3D image signal into a left-eye view image signal and a right-eye view image signal.

Left-eye view image signals or right-eye view image signals extracted from 3D image signals having different depths may differ from one another. That is, a left-eye view image signal or a right-eye view image signal extracted from a 3D image signal may change according to the depth of the 3D image signal.

If the depth of a 3D image signal is changed in accordance with a user input or user settings, the formatter 320 may divide the 3D image signal into a left-eye view image signal and a right-eye view image signal in consideration of the changed depth.

The formatter 320 may scale a 3D image signal, and particularly, a 3D object in a 3D image signal, in various manners.

More specifically, referring to FIG. 6(a), the formatter 320 may generally enlarge or reduce a 3D image signal or a 3D object in the 3D image signal. Alternatively, referring to FIG. 6(b), the formatter 320 may partially enlarge or reduce the 3D image signal or the 3D object into a trapezoid. Alternatively, referring to FIG. 6(c), the formatter 320 may rotate the 3D image signal or the 3D object and thus transform the 3D object or the 3D object into a parallelogram. In this manner, the formatter 320 may add a sense of three-dimensionality to the 3D image signal or the 3D object and may thus emphasize a 3D effect. The 3D image signal may be a left-eye view image signal or a right-eye view image signal of the second image signal 420. Alternatively, the 3D image signal may be a left-eye view image signal or a right-eye view image signal of a PIP image.

In short, the formatter 320 may receive the decoded image signal provided by the image processor 310, may separate a 2D image signal or a 3D image signal from the received image signal, and may divide the 3D image signal into a left-eye view image signal and a right-eye view image signal. Thereafter, the formatter 320 may scale the left-eye view image signal and the right-eye view image signal and may then output the results of the scaling in one of the formats shown in FIGS. 5(a) through 5(e). Alternatively, the formatter 320 may rearrange the left-eye view image signal and the right-eye view image signal in one of the formats shown in FIGS. 5(a) through 5(e) and may then scale the result of the rearrangement.

Referring to FIG. 3(a), the OSD generator 330 may generate an OSD signal in response to or without user input. The OSD signal may include a 2D OSD object or a 3D OSD object.

It may be determined whether the OSD signal includes a 2D OSD object or a 3D OSD object based on user input, the size of the object or whether the OSD object of the OSD signal is an object that can be selected.

The OSD generator 330 may generate a 2D OSD object or a 3D OSD object and output the generated OSD object, whereas the formatter 320 merely processes the decoded image signal provided by the image processor 310. A 3D OSD object may be scaled in various manners, as shown in FIGS. 6(a) through 6(c). The type or shape of a 3D OSD object may vary according to the depth at which the 3D OSD is displayed.

The OSD signal may be output in one of the formats shown in FIGS. 5(a) through 5(e). More specifically, the OSD signal may be output in the same format as that of an image signal output by the formatter 320. For example, if a user selects the top-down format as an output format for the formatter 320, the top-down format may be automatically determined as an output format for the OSD generator 330.

The OSD generator 330 may receive a caption- or data broadcasting-related image signal from the image processor 310, and may output a caption- or data broadcasting-related OSD signal. The caption- or data broadcasting-related OSD signal may include a 2D OSD object or a 3D OSD object.

The mixer 340 may mix an image signal output by the formatter 320 with an OSD signal output by the OSD generator 330, and may output an image signal obtained by the mixing. The image signal output by the mixer 340 may be transmitted to the display 180.

The controller 170 may have a structure shown in FIG. 3(b). Referring to FIG. 3(b), the controller 170 may include an image processor 310, a formatter 320, an OSD generator 330 and a mixer 340. The image processor 310, the formatter 320, the OSD generator 330 and the mixer 340 are almost the same as their respective counterparts shown in FIG. 3(a), and thus will hereinafter be described, focusing mainly on differences with their respective counterparts shown in FIG. 3(a).

Referring to FIG. 3(b), the mixer 340 may mix a decoded image signal provided with the image processor 310 with an OSD signal provided by the OSD generator 330, and then, the formatter 320 may process an image signal obtained by the mixing performed by the mixer 340. Thus, the OSD generator 330 shown in FIG. 3(b), unlike the OSD generator 330 shown in FIG. 3(a), does no need to generate a 3D object. Instead, the OSD generator 330 may simply generate an OSD signal corresponding to any given 3D object.

Referring to FIG. 3(b), the formatter 320 may receive the image signal provided by the mixer 340, may separate a 3D image signal from the received image signal, and may divide the 3D image signal into a plurality of view image signals. For example, the formatter 320 may divide a 3D image signal into a left-eye view image signal and a right-eye view image signal, may scale the left-eye view image signal and the right-eye view image signal, and may output the scaled left-eye view image signal and the scaled right-eye view image signal in one of the formats shown in FIGS. 5(a) through 5(e).

The structure of the controller 170 shown in FIG. 3(a) or 3(b) is exemplary. The elements of the controller 170 may be incorporated into fewer modules, new elements may be added to the controller 170 or some of the elements of the controller 170 may not be provided. That is, two or more of the elements of the controller 170 may be incorporated into a single module, or some of the elements of the controller 170 may each be divided into two or more smaller portions. The functions of the elements of the controller 170 are also exemplary, and thus do not put any restrictions on the scope of the present invention.

Figure 7A:
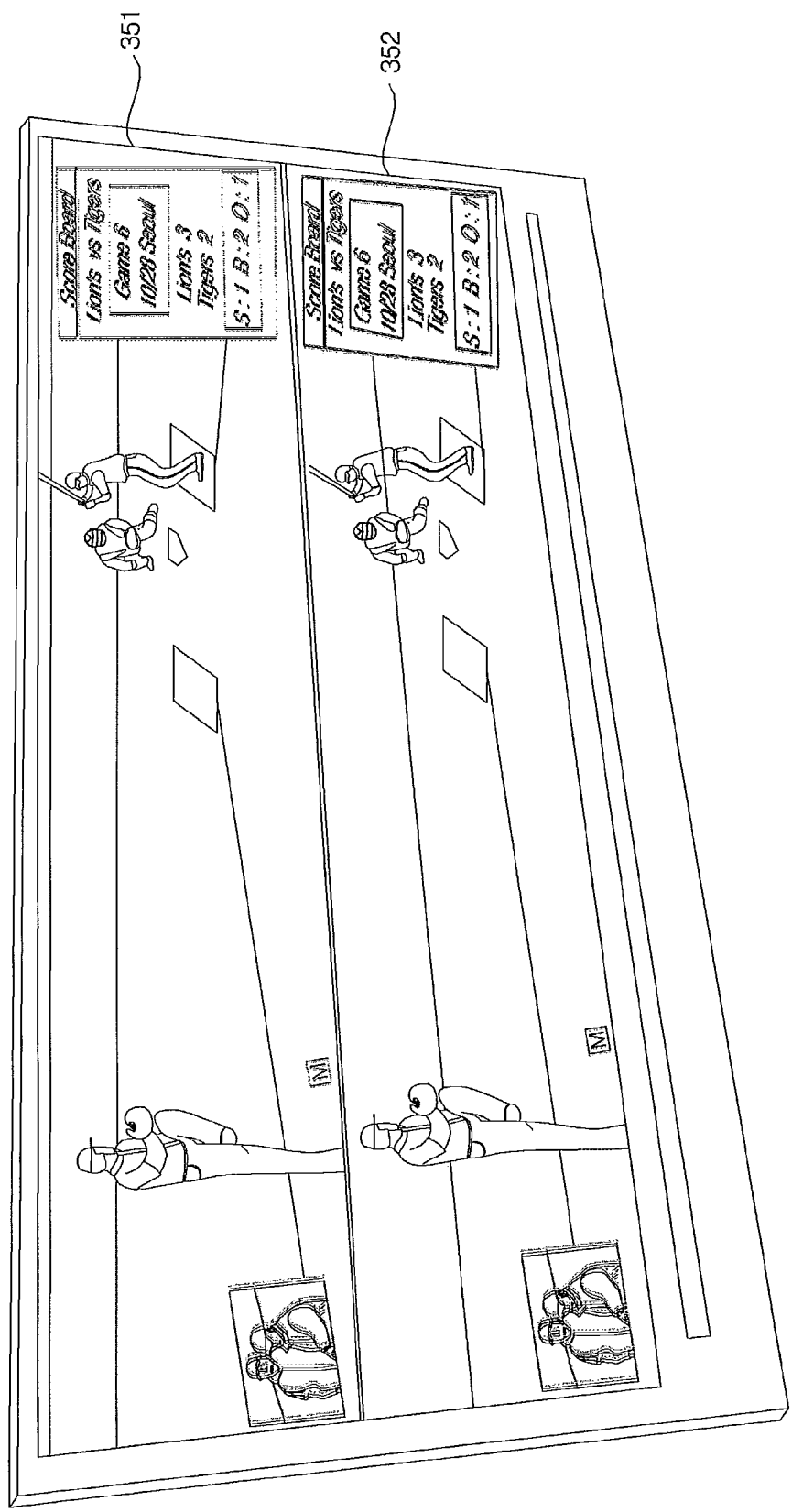
FIGS. 7A through 7C illustrate various images that can be displayed by the image display apparatus shown in FIG. 1.
Figure 7B:
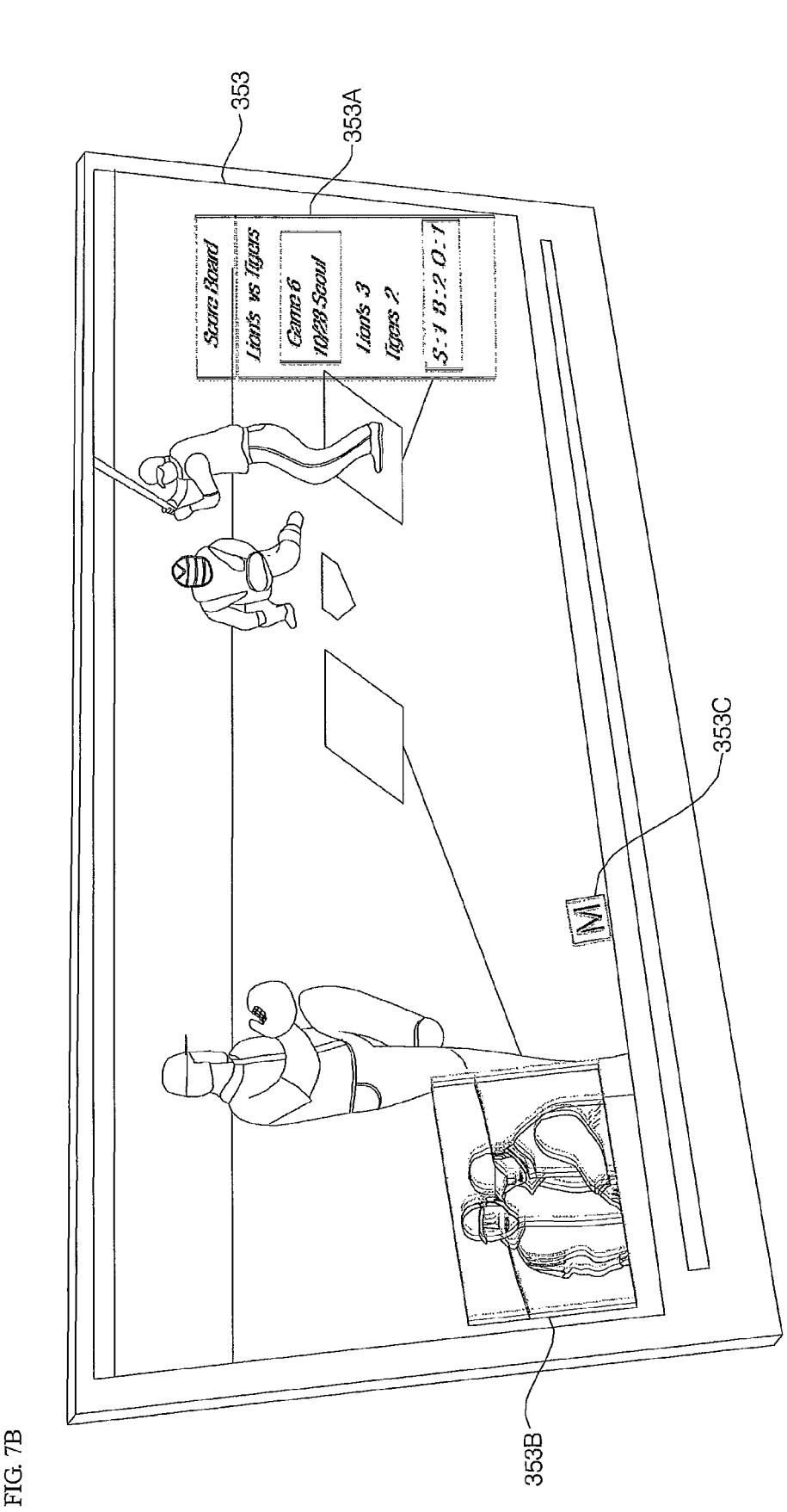
Figure 7C:
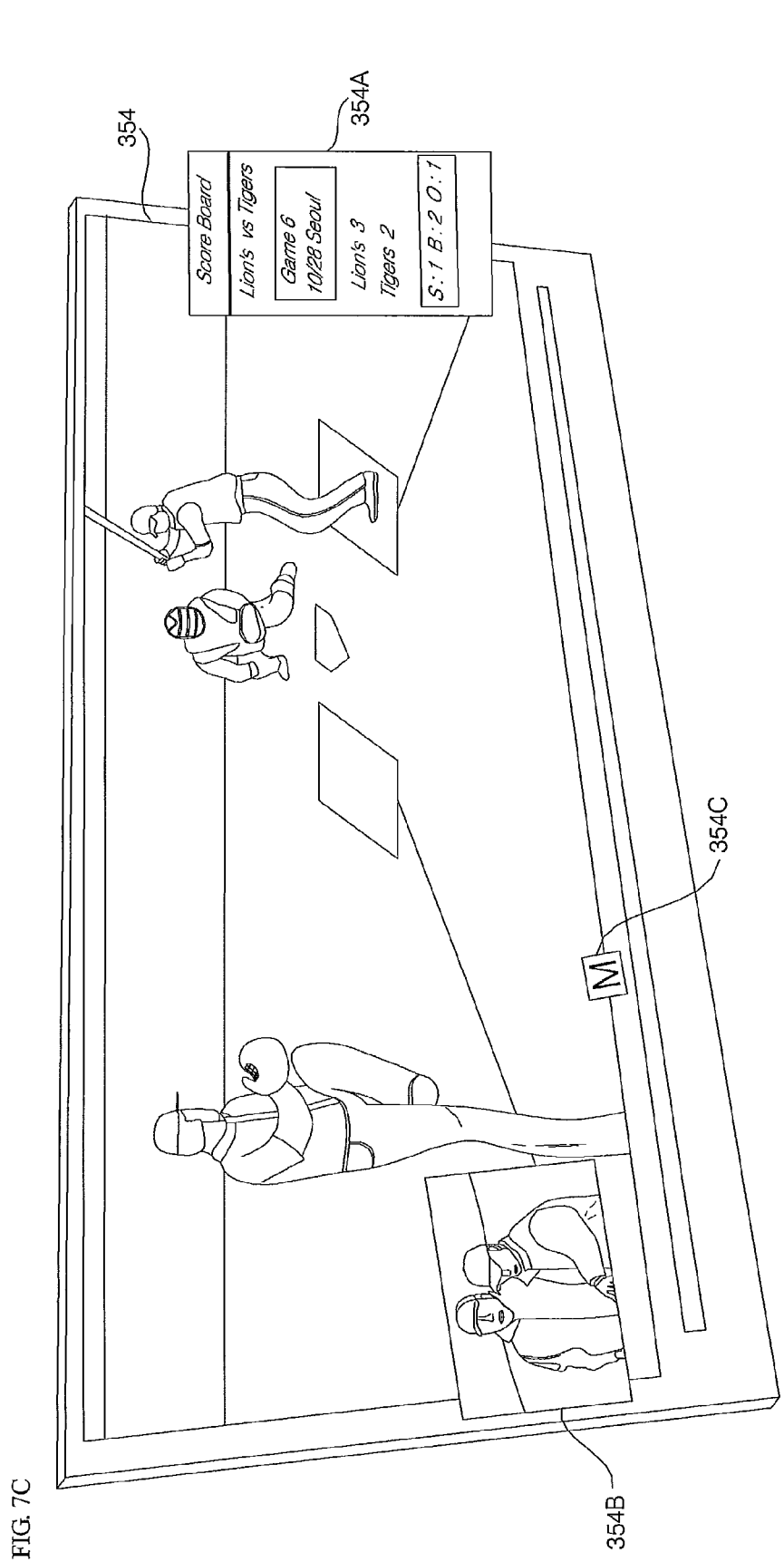

FIGS. 7A through 7C illustrate various images that can be displayed by the image display apparatus 100. Referring to FIGS. 7A through 7C, the image display apparatus 100 may display a 3D image in one of the formats shown in FIGS. 5(a) through 5(e), e.g., the top-down format.

More specifically, referring to FIG. 7A, when the play of video data is terminated, the image display apparatus 100 may display two view images 351 and 352 in the top-down format so that the two view images 351 and 352 can be arranged side by side vertically on the display 180.

The image display apparatus 100 may display a 3D image on the display 180 using a method that requires the use of polarized glasses to properly view the 3D image. In this case, when viewed without polarized glasses, the 3D image and 3D objects in the 3D image may not appear in focus, as indicated by reference numerals 353 and 353A through 353C.

On the other hand, when viewed with polarized glasses, not only the 3D image but also the 3D objects in the 3D image may appear in focus, as indicated by reference numerals 354 and 354A through 354C. The 3D objects in the 3D image may be displayed as if protruding beyond the 3D image.

If the image display apparatus 100 displays a 3D image using a method that does not require the use of polarized glasses to properly view the 3D image, the 3D image and 3D objects in the 3D image may all appear in focus even when viewed without polarized glasses, as shown in FIG. 7C.

The term 'object,' as used herein, includes various information regarding the image display apparatus 100 such as audio output level information, channel information, or current time information and an image or text displayed by the image display apparatus 100.

For example, a volume control button, a channel button, a control menu, an icon, a navigation tab, a scroll bar, a progressive bar, a text box and a window that can be displayed on the display 180 of the image display apparatus 100 may be classified as objects.

A user may acquire information regarding the image display apparatus 100 or information regarding an image displayed by the image display apparatus 100 from various objects displayed by the image display apparatus 100. In addition, a user may input various commands to the image display apparatus 100 through various objects displayed by the image display apparatus 100.

When a 3D object has as positive depth, it may be displayed as if protruding toward a user. The depth on the display module 180 or the depth of a 2D image or a 3D image displayed on the display 180 may be set to 0. When a 3D object has a negative depth, it may be displayed as if recessed into the display 180. As a result, the greater the depth of a 3D object is, the more the 3D object appears protruding toward a user.

The term '3D object,' as used herein, includes various objects generated through, for example, a scaling operation, which has already been described above with reference to FIGS. 6(a) through 6(c), so as to create a sense of three-dimensionality or the illusion of depth.

FIG. 7C illustrates a PIP image as an example of a 3D object, but the present invention is not restricted to this. That is, electronic program guide (EPG) data, various menus provided by the image display apparatus 100, widgets or icons may also be classified as 3D objects.

Figure 8:
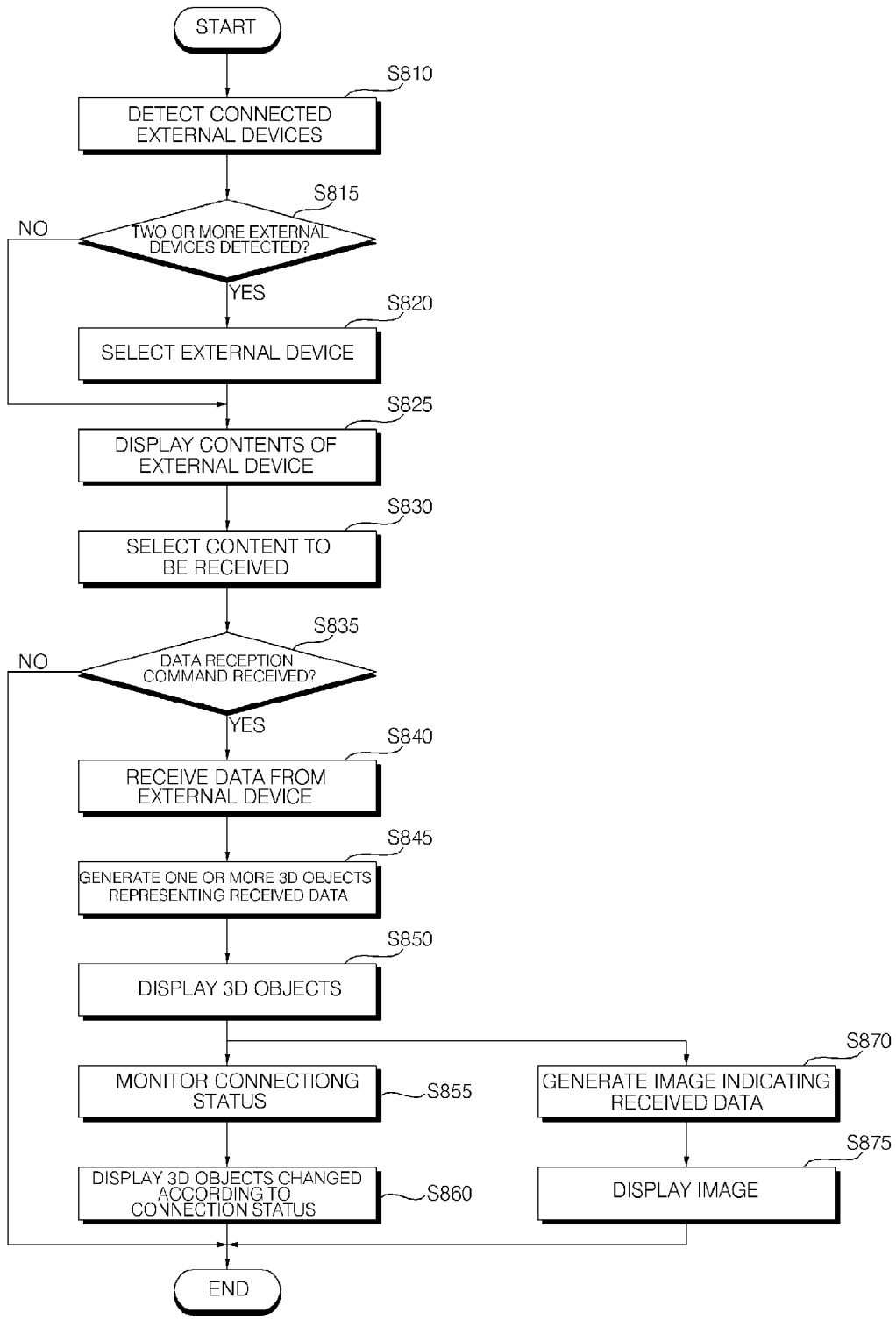
FIG. 8 is a flowchart illustrating a method for operating the image display apparatus according to an exemplary embodiment of the present invention.

FIG. 8 is a flowchart illustrating a method for operating the image display apparatus according to an exemplary embodiment of the present invention. The method for operating the image display apparatus is about displaying 3D objects corresponding to received data, when the image display apparatus receives the data from an external device.

Referring to FIG. 8, connected external devices are detected in step S810.

The image display apparatus 100 may be connected to external devices wirelessly or non-wirelessly through the external signal I/O portion 130 illustrated in FIG. 1.

Specifically, the controller 170 may determine whether the image display apparatus 100 has been connected to an external device based on the amount of data transmitted to and received from the external device, the strength of a signal received from the external device, or power supplied to the external device (e.g. USB power 5V).

It is determined whether a plurality of connected external devices have been detected in step S815. Upon detection of a plurality of connected external devices, at least one of the connected external devices is selected in step S820.

Specifically, in the presence of a plurality of connected external devices, objects corresponding to the external devices may be displayed on the display 180 and the user may select at least one of the external devices by means of the remote control device 200.

It may further be contemplated that a 3D object corresponding to a connected external device is generated and displayed on the display 180. When a plurality of connected external devices are detected, a plurality of 3D objects corresponding to the external devices may be displayed on the display 180. Preferably, the 3D objects are at a different depth from a 2D or 3D image displayed on the display 180. Thus the user can intuitively identify the connected external devices. At least one of the 3D objects may be selected by a user gesture or an input from the remote control device 200.

On the other hand, if only one connected external device has been detected in step S815, the procedure may jump to step S825.

In step S825, contents that the external device has are displayed. In case of a plurality of detected external devices, contents of the selected external device may be displayed, whereas in case of a single detected external device, contents of the single detected external device may be displayed.

The controller 170 may control the contents displaying such that contents that the image display apparatus 100 can play or display are distinguished from contents that it cannot play or display. For example, if the controller 170 is not provided with a decoder for decoding a moving image file of the external device, the controller 170 may classify the moving image file as a non-playable content and display the moving image file distinguishably from a playable content. For instance, the non-playable content may be displayed differently from the playable content, in at least one of size, brightness, transparency, color, and shaking.

Meanwhile, the contents of the external device may be displayed if a menu item "open" is selected from a management menu of the external device displayed on the display 180. The management menu may be displayed as a 3D object, which is a pull-down menu or a pop-up menu. Also it is possible to configure the management menu as a sliding menu in such a manner that the 3D object corresponding to the external device disappears and the 3D object corresponding to the management menu appears in place of the disappearing 3D object. Therefore, the user can select various menu items for the selected external device, with increased convenience. Alternatively or additionally, the management menu may take the form of a 2D object, which may be displayed on the display 180.

In step S830, a content to be received is selected. For example, while the contents of the external device are displayed by selecting the menu item "open", the content to be received may be selected from among the displayed contents by a user gesture or an input from the remote control device 200.

Subsequently, it is determined whether a data reception command has been issued in step S835. A command indicating whether to receive the content from the external device in the image display apparatus 100 may be received.

Before reception of the data reception command is monitored, the capacity, available capacity, etc. of the storage 140 in the image display apparatus 100 may be notified to the user (not shown). For instance, an object indicating whether there is sufficient or insufficient storage capacity for storing the selected content may be displayed on the display 180. The user can determine whether to receive the selected content, referring to this object.

Upon receipt of the data reception command, data corresponding to the selected content is received from the external device in step S840. The received data may include at least one of a still image file, a moving image file, an audio file, and a text file, for example. The data may be received through the external signal I/O portion 130 and processed by the controller 170. For example, the received data may be stored in the storage 140 or displayed on the display 180.

In step S845, one or more 3D objects corresponding to the received data are generated. The controller 170 is responsible for generating the 3D objects corresponding to the received data. The 3D objects may be images corresponding to the received data.

More specifically, the image processor 310 may process the received data and the formatter 320 may generate the 3D objects corresponding to the received data. During the 3D object generation, the depth of the 3D objects corresponding to the received data may be set to be different from the display 180 or an image displayed on the display 180.

The controller 170, particularly the formatter 320 may process the 3D objects corresponding to the received data so that the 3D objects are displayed differently from one another in at least one of size and depth according to the progress of the data transfer. The formatter 320 may scale up the 3D objects corresponding to the received data at gradually increasing ratios or scale down the 3D objects corresponding to the received data at gradually decreasing ratios according to the progress of the data transfer. In addition, the formatter 320 may set different depths for different ones of the 3D objects corresponding to the received data so that the 3D objects corresponding to the received data are getting deeper or less deep.

The formatter 320 may process the 3D objects corresponding to the received data such that as a 3D object is deeper, the disparity between its left-eye and right-eye view of the 3D objects is narrower.

The left-eye and right-eye view of the 3D objects may be output in one of the formats illustrated in FIG. 5.

In step S850, the 3D objects corresponding to the received data are displayed under the control of the controller 170. Because the 3D objects corresponding to the received data are processed to have a different depth from the image displayed on the display 180, for example, a positive depth, the 3D objects corresponding to the received data are displayed, giving the illusion of 3D. Among the afore-described display schemes, a glass-type display scheme makes the 3D objects corresponding to the received data appear protruding to the user, when the user wears 3D glasses.

Especially, the 3D objects corresponding to the received data are processed so that they vary in at least one of size and depth during displaying according to the progress of the data transfer. Accordingly, the user can intuitively recognize the progress of the data transfer by the 3D objects corresponding to the received data.

In step S855, the connection status of the external device is monitored. The 3D objects corresponding to the received data are displayed changed according to the connection status of the external device in step S860.

The controller 170 may determine the connection status of the external device based on the strength of a signal received from or the amount of data received from the external device. Especially, the 3D objects corresponding to the received data may be displayed differently according to a radio environment.

For example, the 3D objects corresponding to the received data may be displayed with a change in at least one of size, brightness, transparency, color, and shaking, according to the connection status of the external device. 3D objects corresponding to data received from a well-connected external device may be displayed brighter, whereas 3D objects corresponding to data received from a poorly-connected external device may be displayed less bright or shaken. Therefore, the user can intuitively identify the connection status of the external device.

An image corresponding to the received data may be generated in step S870 and displayed on the display 180 in step S875. The controller 170 may control generation and displaying of an image or thumbnail image corresponding to the data received from the external device.

For example, the controller 170 may generate an image or thumbnail image corresponding to the data received from the external device and display the image or thumbnail image on the display 180. In case of the thumbnail image, the thumbnail image may be displayed in a certain area of the display 180, whereas in case of the image, the image may be displayed across the entire area of the display 180.

In this manner, the user can recognize the data received from the external device on the display 180 as well as from the 3D objects corresponding to the received data.

Meanwhile, if a plurality of external devices are selected in step S820, data may be received simultaneously or sequentially from the selected external devices. When the data reception is simultaneous, 3D objects corresponding to the received data may be displayed separately for the respective external devices. Obviously, the 3D objects corresponding to the received data are different in depth from images displayed on the display 180.

For example, the 3D objects may vary according to the external devices in at least one of display coordinates, size, brightness, transparency, color and shaking. When images or thumbnail images corresponding to the received data are generated and displayed on the display 180, the images or thumbnail images may be displayed in different areas of the display 180 for the different external devices.

FIGS. 9 to 19 are views referred to for describing various examples of the method for operating the image display apparatus, illustrated in FIG. 8.

Figure 9:
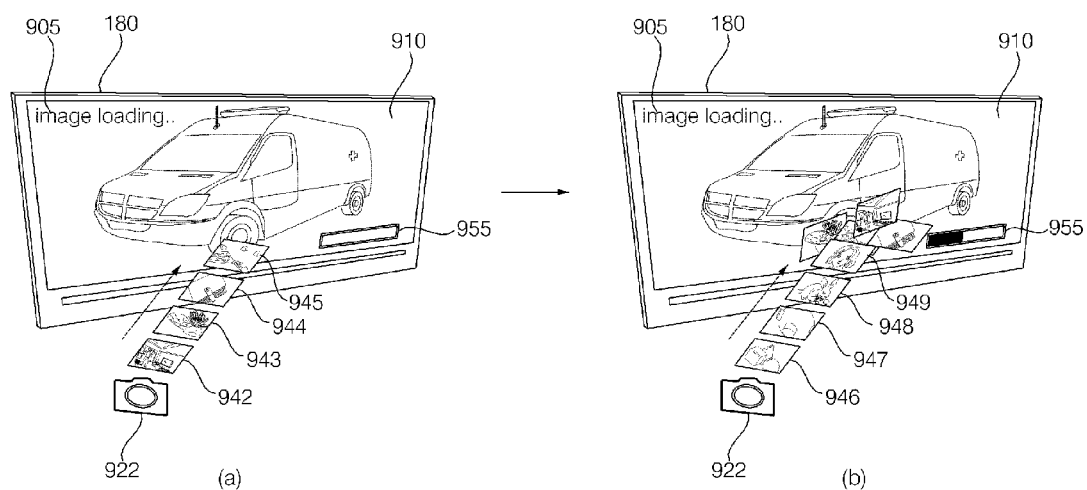
FIGS. 9 to 19F are views referred to for describing various examples of the method for operating the image display apparatus, illustrated in FIG. 8.

FIG. 9 illustrates three-dimensional displaying of 3D objects 942 to 945 or 946 to 949 corresponding to a still image file received from a camera, with an image 910 displayed on the display 180. The 3D objects 942 to 945 or 946 to 949 are at a different depth from the image 910, for example, a positive depth. Hence, the 3D objects 942 to 945 or 946 to 949 may look protruding to the user.

The 3D objects corresponding to the received data may vary in depth according to the reception order of the data. In FIG. 9(*a*), the 3D object 942 is deepest, whereas the 3D object 945 is least deep.

While the 3D objects 942 to 945 are shown in FIG. 9(*a*) to be displayed simultaneously in order to give the illusion of 3D, to which the present invention is not limited, the 3D objects 942 to 945 may be displayed sequentially.

If a 3D object 922 corresponding to the camera is further displayed, the 3D object 922 may be deeper than the 3D objects 942 to 945 or 946 to 949 corresponding to the received still image file.

An object 905 indicating that the still image file reception is in progress may be displayed on the display 180. Alternatively or additionally, an object indicating at least one of the transmission rate, transmitted amount, required time for transmission, transmission speed, transmission complete time, and remaining time for completed transmission of the still image file and an available storage capacity of the image display apparatus 100 may be displayed.

Among them, an object 955 indicating the transmission rate of the still image file is displayed in FIG. 9.

In FIG. 9(*a*), the reception of the still image file starts and thus its transmission rate is about 0%. As the still image file reception has been proceeding to a certain extent in FIG. 9(*b*), the 3D objects 942 to 945 corresponding to an already received part of the still image file are displayed stacked on or near the display 180. To exert the stacking effect, the 3D objects 942 to 945 may be less deep in FIG. 9(*b*) than in FIG. 9(*a*). The 3D objects 946 to 949 corresponding to a received new part of the still image file are further displayed in FIG. 9(*b*). Therefore, the user can intuitively recognize the reception status of the still image file.

Figure 10:
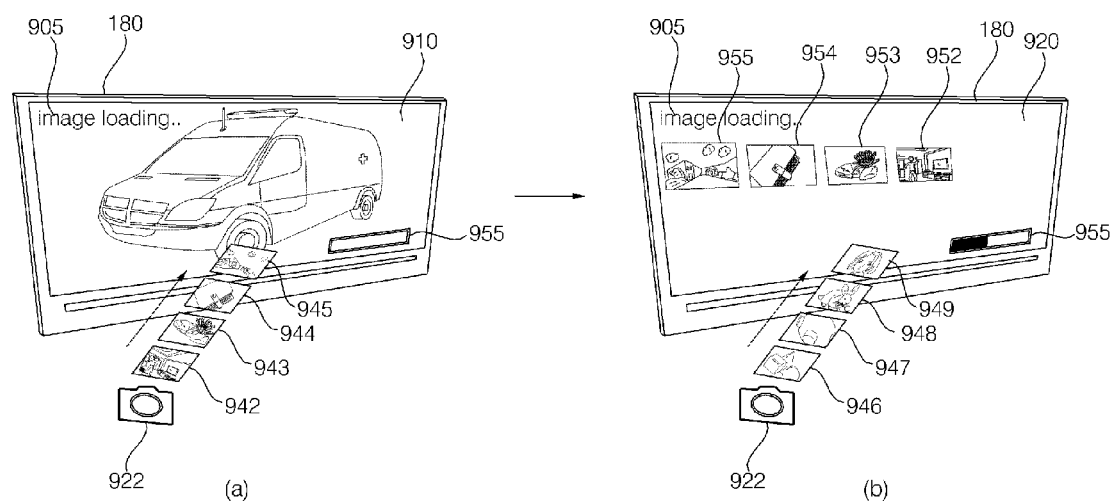

FIG. 10 illustrates three-dimensional displaying of the 3D objects corresponding to the still image file received from the camera, with the image 910 displayed on the display 180, as in FIG. 9. However, FIG. 10 is different from FIG. 9 in that images or thumbnail images corresponding to an already received part of the still image file may be displayed on the display 180.

FIG. 10(*b*) illustrates displaying of a screen 920 with thumbnail images 952 to 9855 corresponding to an already received part of the still image file in a certain part of the display 180. Hence, the user can identify the data received from the external device on the display 180 as well as from the 3D objects corresponding to the received data.

Figure 11:
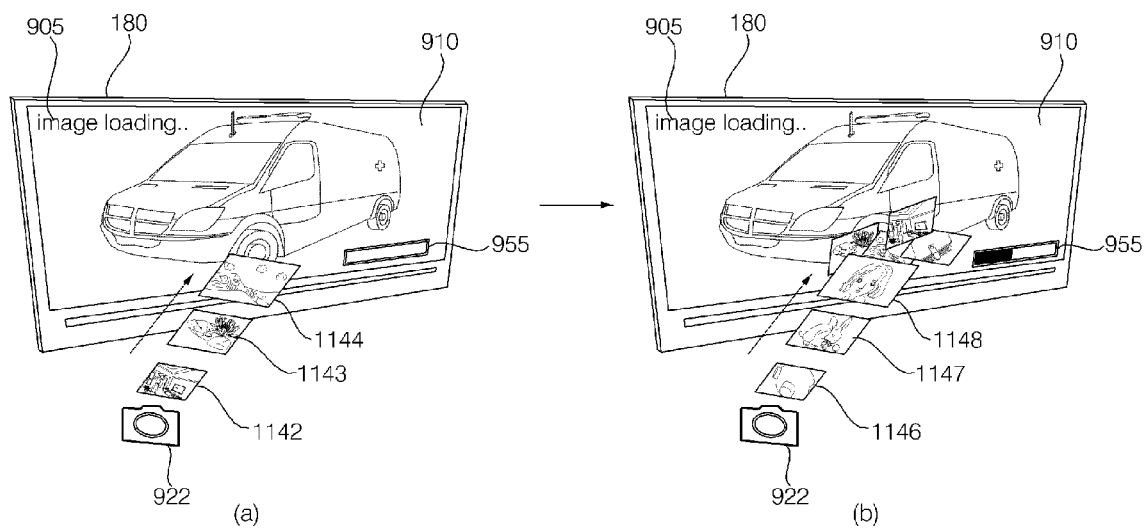

FIG. 11 illustrates displaying of a plurality of 3D objects corresponding to received data, in different sizes. With the image 910 displayed on the display 180, 3D objects 1142, 1143 and 1144 or 3D objects 1146, 1147 and 1148, which represent the still image file received from the camera, are displayed three-dimensionally in such a manner that as a 3D object is deeper, the 3D object is displayed smaller. In FIG. 11(*a*), because the 3D object 1142 is deepest, the 3D object 1142 may be set to be displayed smaller than other objects. The 3D object 1144, which is least deep, may be set to be displayed larger than other objects.

Because the 3D objects corresponding to the received data are getting bigger toward the image display apparatus 100, the user can intuitively recognize the progress of the data transfer.

Figure 12:
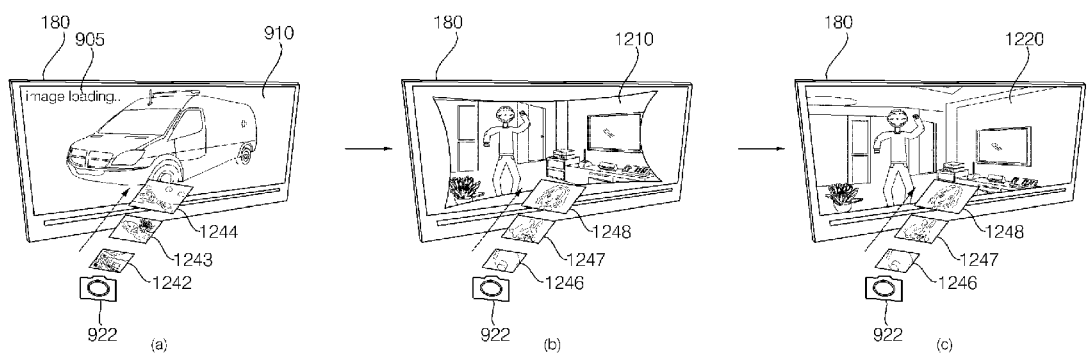

FIG. 12 illustrates displaying of an image of already received data on the display 180, while 3D objects corresponding to received data are displayed in different sizes.

As in FIG. 11, a plurality of 3D objects 1242, 1243 and 1244 or a plurality of 3D objects 1246, 1247 and 1248, which represent data received from the camera, are displayed with the illusion of 3D in such a manner that as a 3D object is deeper, the 3D object is displayed smaller.

In the meantime, an image or thumbnail image of an already received part of the still image file may be displayed on the display 180.

FIG. 12(*b*) illustrates displaying of a thumbnail image 1210 corresponding to an already received part of the still image file, as a 3D image flapping near the display 180.

FIG. 12(*c*) illustrates displaying of the thumbnail image 1210 corresponding to the already received part of the still image file as a thumbnail image 1220 occupying the entire area of the display 180.

In this way, the user can identify the data received from the external device near or on the display 180 as well as the 3D objects corresponding to the received data.

Figure 13:
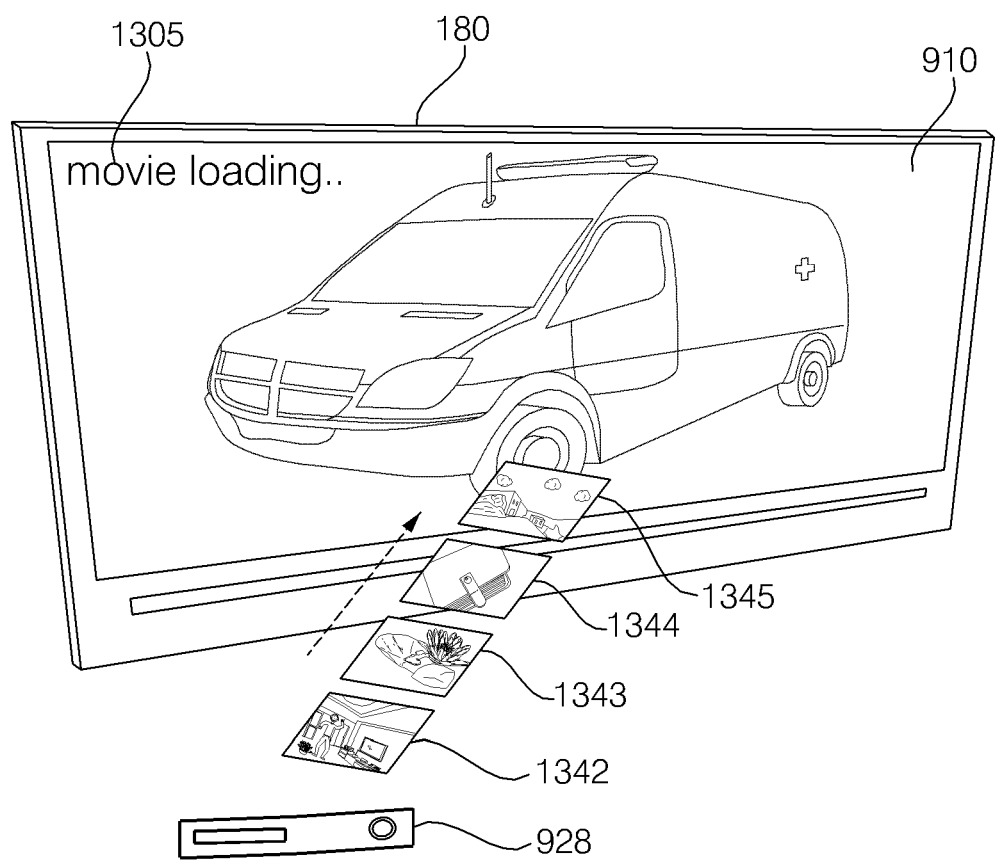

FIG. 13 illustrates three-dimensional displaying of 3D objects 1342 to 1345 corresponding to a moving image file received from a DVD player, with the image 910 displayed on the display 180. The 3D objects 1342 to 1345 are at a different depth from the image 910, for example, a positive depth. Hence, the 3D objects 1342 to 1345 may look protruding to the user.

The 3D objects 1342 to 1345 corresponding to the moving image file may be displayed as thumbnail images or thumbnail moving images. Herein, the 3D objects 1342 to 1345 take the form of thumbnail images.

If a 3D object 928 corresponding to the DVD player is also displayed, the 3D object 928 may be deeper than the 3D objects corresponding to the received moving image file.

An object 1305 indicating that the moving image file reception is in progress may be displayed on the display 180. Alternatively or additionally, an object indicating at least one of the transmission rate, transmitted amount, required time for transmission, transmission speed, transmission complete time, and remaining time for completed transmission of the moving image file and an available storage capacity of the image display apparatus 100 may be displayed. Hence, the user can intuitively recognize the reception state of the moving image file.

The description of FIGS. 10, 11 and 12 may apply to the case of transmitting a moving image file.

Figure 14:
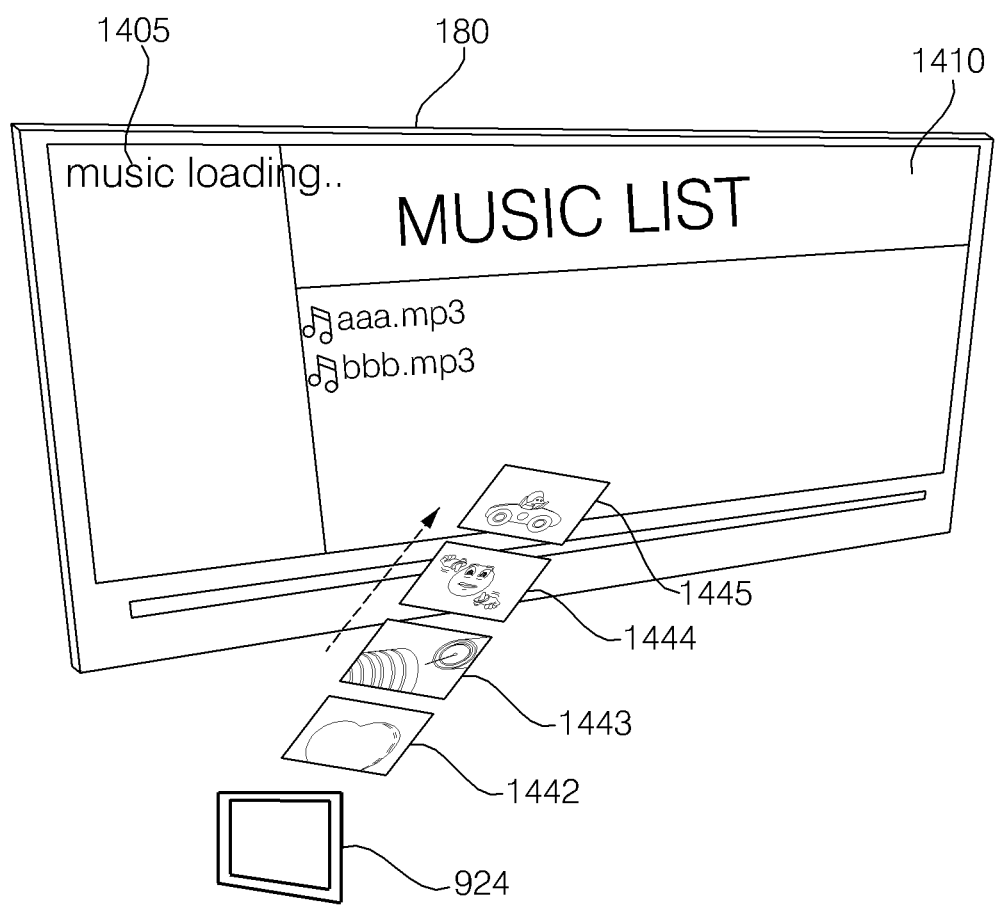

FIG. 14 illustrates three-dimensional displaying of 3D objects 1442 to 1445 corresponding to an audio file received from a portable multimedia player (PMP), with an image 1410 displayed on the display 180. The 3D objects 1442 to 1445 are at a different depth from the image 1410, for example, a positive depth. Hence, the 3D objects 1442 to 1445 may look protruding to the user.

The 3D objects 1442 to 1445 corresponding to the audio file may be displayed as thumbnail images corresponding to the audio file.

If a 3D object 924 corresponding to the PMP is also displayed, the 3D object 924 may be deeper than the 3D objects 1442 to 1445 corresponding to the received audio file.

An object 1405 indicating that the audio file reception is in progress may be displayed on the display 180. Alternatively or additionally, an object indicating the transmission rate of the received data may be displayed. Hence, the user can intuitively recognize the reception state of the audio file.

The description of FIGS. 10, 11 and 12 may also apply to the case of transmitting a moving image file.

Figure 15:
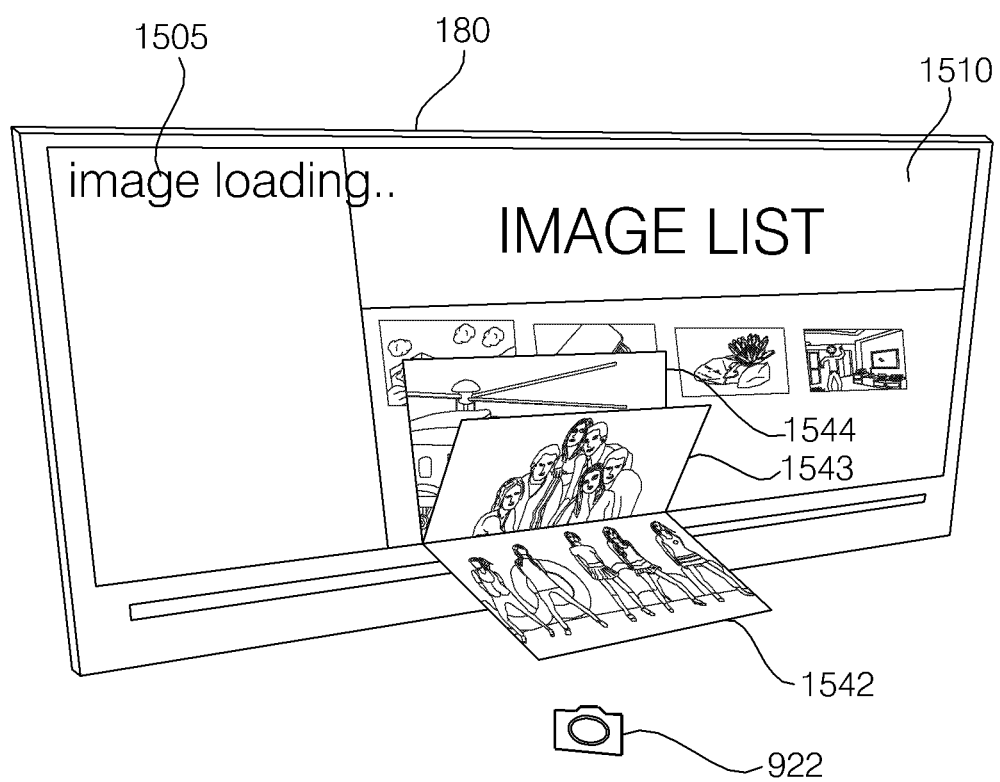

FIG. 15 illustrates three-dimensional displaying of 3D objects 1542, 1543 and 1544 corresponding to a still image file received from the camera, with an image 1510 displayed on the display 180. The 3D objects 1542, 1543 and 1544 are at a different depth from the image 1510, for example, a positive depth. Particularly, the 3D objects 1542, 1543 and 1544 may be displayed in a sliding manner as illustrated in FIG. 15. Hence, the 3D objects 1542, 1543 and 1544 may look protruding to the user.

An object 1505 indicating that the still image file reception is in progress may be displayed on the display 180.

Figure 16:
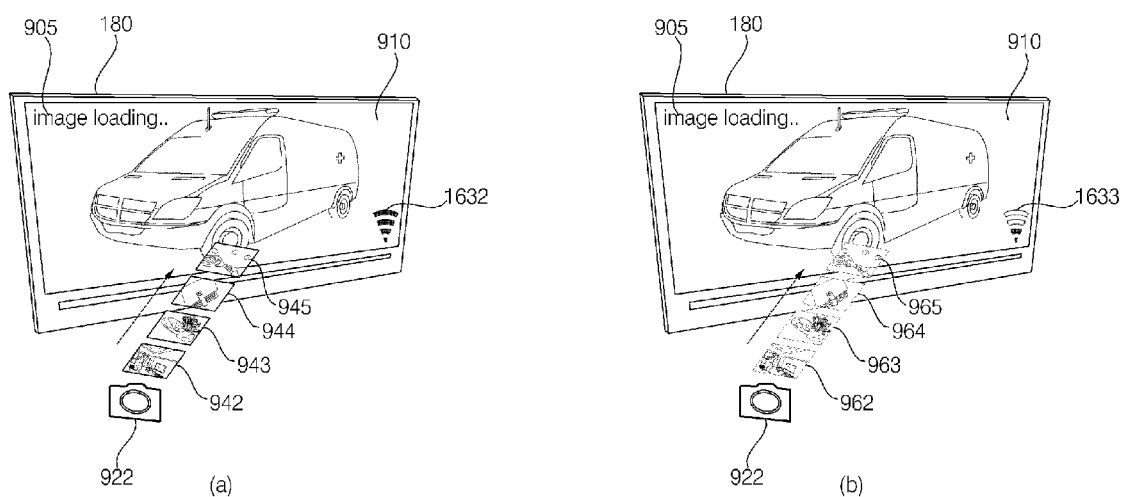

FIG. 16 illustrates displaying of 3D objects corresponding to data received from an external device, with a change in at least one of size, brightness, transparency, color and shaking according to the connection status between the external device and the image display apparatus 100, while the image 910 is displayed on the display 180.

In a good radio environment, 3D objects 942 to 945 corresponding to data received from the camera may be displayed clear as illustrated in FIG. 16(*a*), whereas in a poor radio environment, 3D objects 962 to 965 corresponding to data received from the camera may be displayed dim as illustrated in FIG. 16(*b*). Wireless connection icons 1632 and 1633 corresponding to the radio environments may further be displayed on the display 180.

The controller 170 may identify the connection status of an external device based on the strength of a radio signal received from the external device.

Figure 17:
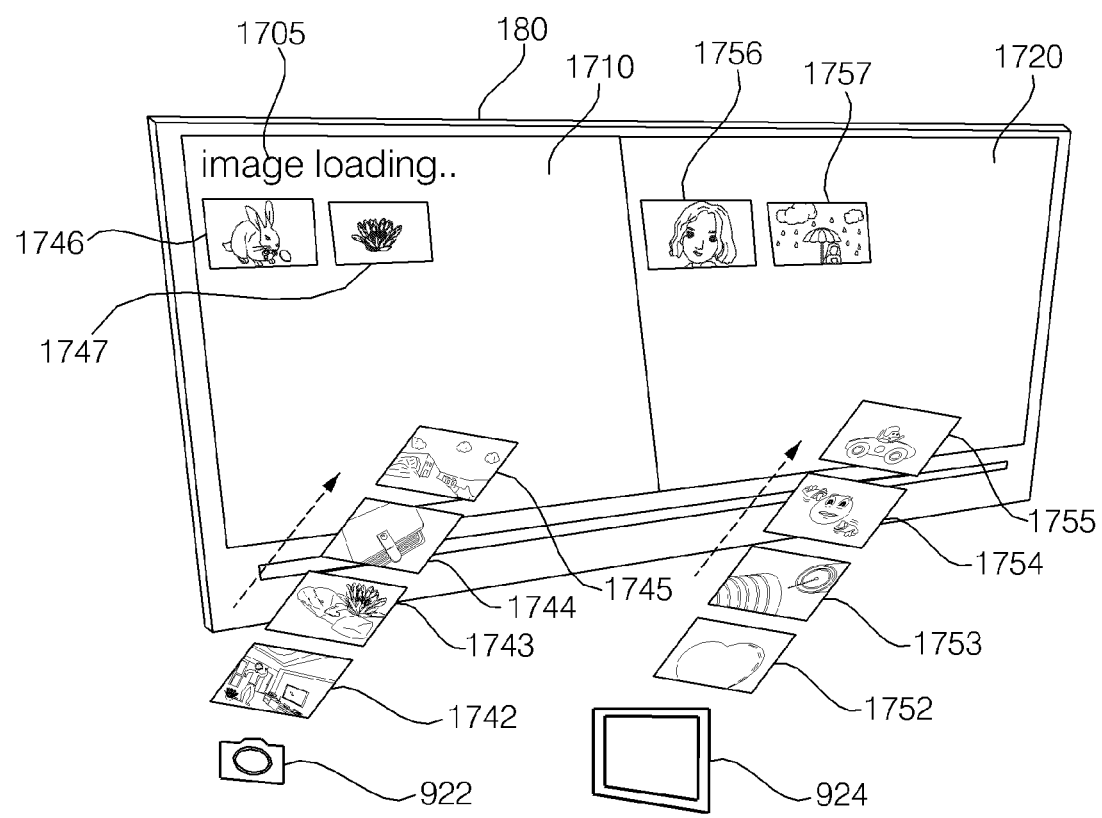

FIG. 17 illustrates separate displaying of 3D objects corresponding to data received from a plurality of connected external devices and displaying of images or thumbnail images corresponding to already received data from the external devices in different areas of the display 180.

Referring to FIG. 17, 3D objects 1742 to 1745 represent data received from the camera, and 3D objects 1752 to 1755 represent data received from the PMP.

A screen 1710 including thumbnail images 1746 and 1747 corresponding to data already received from the camera is displayed in an area of the display 180, whereas a screen 1720 including thumbnail images 1756 and 1757 corresponding to data already received from the PMP is displayed in another area of the display 180. Thus, when data is received from a plurality of external devices, the user can intuitively recognize the data receptions separately.

Figure 18:
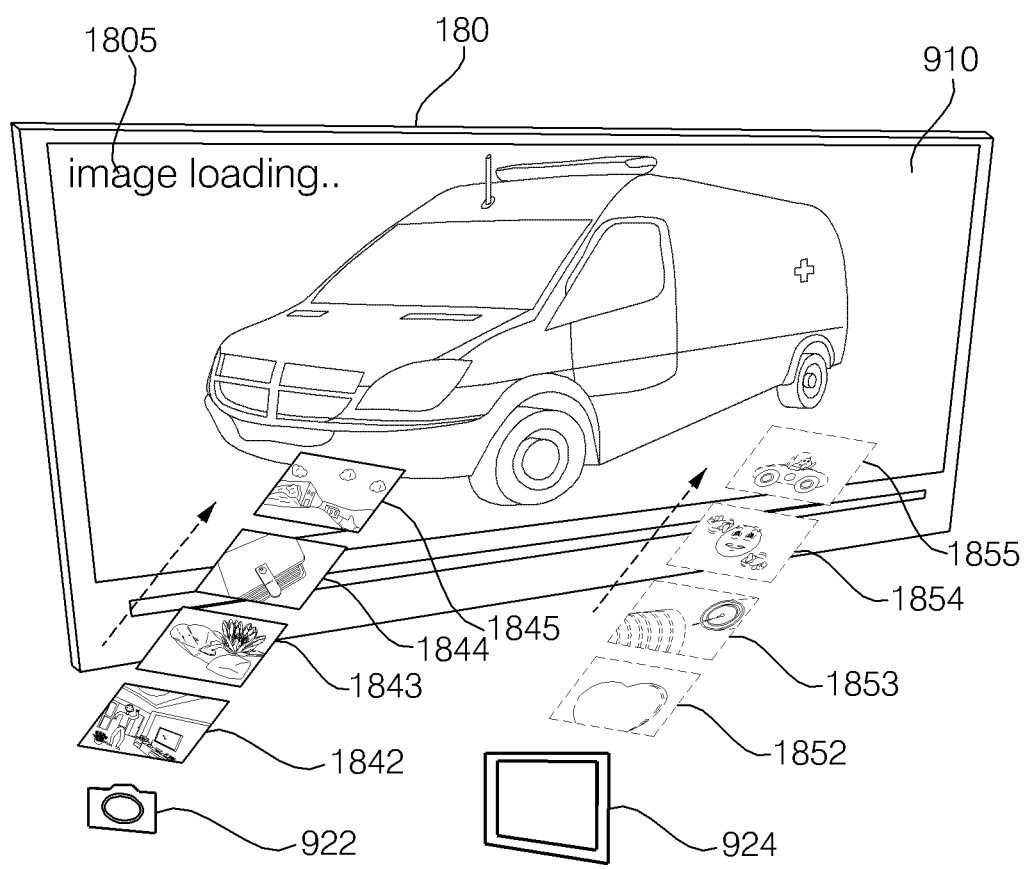

FIG. 18 illustrates separate displaying of 3D objects corresponding to data received from a plurality of connected external devices, differently in at least one of size, brightness, transparency, and color according to the external devices corresponding to the 3D objects. Herein, the 3D objects have different transparency levels according to their external devices, by way of example.

Referring to FIG. 18, 3D objects 1842 to 1845 corresponding to data received from the camera may be displayed clear, whereas 3D objects 1852 to 1855 corresponding to data received from the PMP may be displayed dim. Accordingly, when receiving data from a plurality of external devices, the user can intuitively recognize the data receptions from the external devices, separately.

Figure 19A:
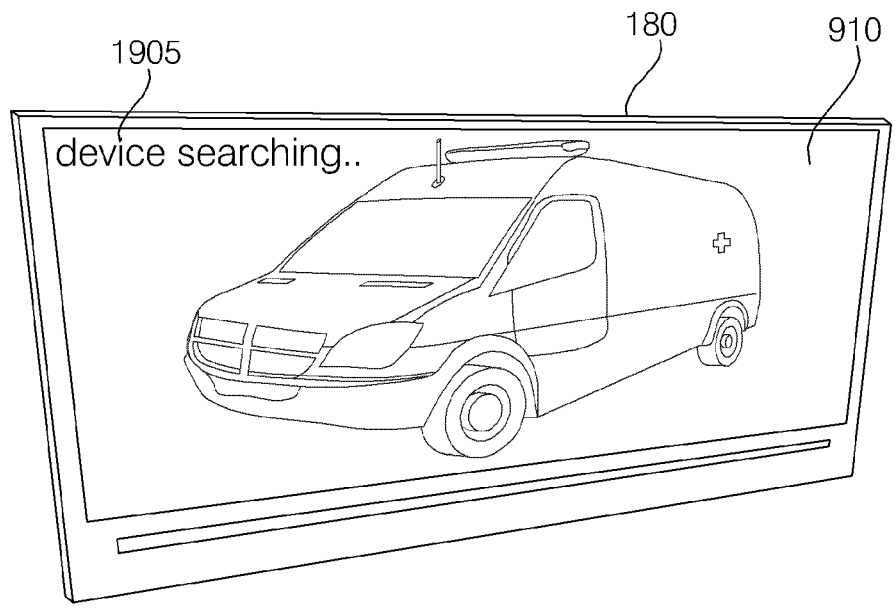
Figure 19B:
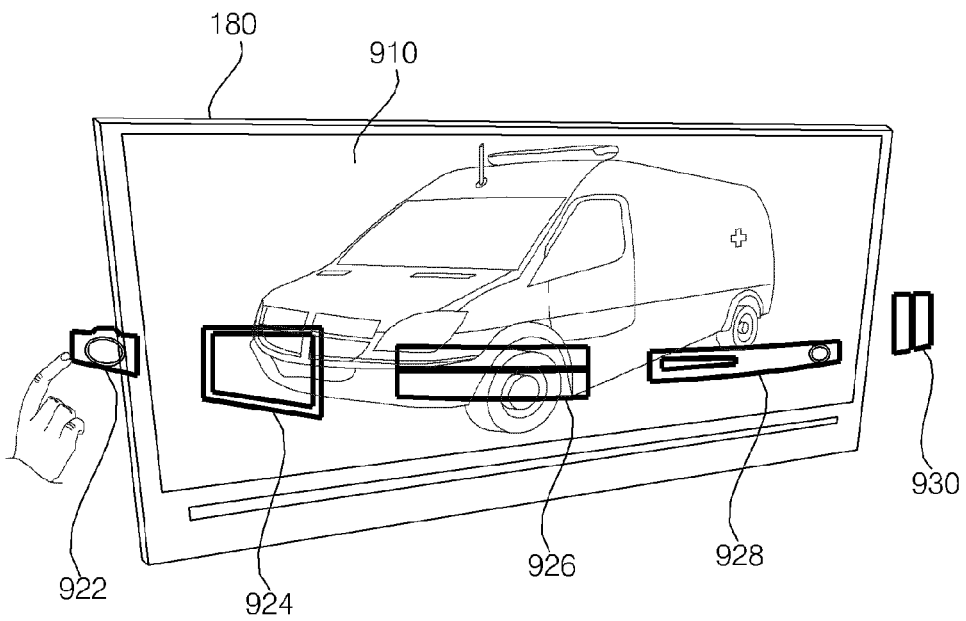

FIG. 19 illustrates data reception from an external device in the image display apparatus 100.

Referring to FIG. 19(*a*), the image display apparatus 100 searches for a connected external device, while the image 910 is displayed on the display 180. An object 1905 indicating that external devices are being searched may be displayed on the display 180.

The controller 170 may determine whether an external device has been connected based on the amount of data transmitted to and received from the external device, the strength of a signal received from the external device, or power supplied to the external device (e.g. USB power 5V).

The external device may be connected wirelessly or non-wirelessly through the external signal I/O portion 130 illustrated in FIG. 1.

Referring to FIG. 19(*b*), the controller 170 generates the 3D objects 922, 924, 926, 928 and 930 corresponding to the connected external devices according to the search results and displays them.

It is shown in FIG. 19(*b*) that as the image display apparatus 100 is connected to all of the camera, the PMP, the set-top box, the DVD player, and the game console, the 3D objects 922, 924, 926, 928 and 930 corresponding to these external devices are displayed.

The 3D objects 922, 924, 926, 928 and 930 are at different depths from the image 910. Further, the 3D objects 922, 924, 926, 928 and 930 may look protruding to different degrees according to their depths.

The 3D objects 922, 924, 926, 928 and 930 may be arranged in the pattern of a fish eye as illustrated in FIG. 19(*b*), a circle or a polyhedron. To allow the user to view the image 910 displayed on the display 180 without disturbance, the 3D objects 922, 924, 926, 928 and 930 may be displayed in the vicinity of a corner of the display 180.

As stated before, the 3D objects 922, 924, 926, 928 and 930 may be displayed differently according to the connection statuses of the external devices corresponding to the 3D objects 922, 924, 926, 928 and 930.

If at least one 922 of the 3D objects 922, 924, 926, 928 and 930 is selected, a management menu 1910 of the external device corresponding to the selected 3D object 922 may be displayed, as illustrated in FIG. 19(C).

The management menu 1910 is shown in FIG. 19(*c*) to be a pull-down menu, to which the present invention is not limited. The management menu 1910 may be a pop-up menu. Also it is possible to configure the management menu 1910 as a sliding menu in such a manner that the 3D object 922 corresponding to the selected external device 922 disappears and the management menu 1910 appears in place of the disappearing 3D object 922.

The management menu 1910 may be a 3D object, as illustrated in FIG. 19(*c*). Hence, the management menu 1910 may have a different depth from the image 910 displayed on the display 180.

The management menu 910 may include various menu items, for example, "transfer" for data transmission to the image display apparatus 100, "disconnection" for releasing the connection of the external device from the image display apparatus 100, and "open" for opening files of the external device.

A 3D object may be selected by a user gesture or an input from the remote control device 200. Then the user may invoke many functions in relation to the connected external device.

Meanwhile, upon selection of "open" in the management menu 1910, contents of the external device may be displayed and a content to be transmitted to the image display apparatus 100 may be selected from among the displayed contents, as illustrated in FIG. 19(*d*).

Then the image display apparatus 100 receives a command indicating whether the selected content is to be received. For example, an object 1930 "receive OK?" may be displayed on the display 180 in FIG. 19(*e*). Hence, the user can enter a command indicating whether the content will be received or not by making a gesture or manipulating the remote control device 200. The object 1930 may be a 3D object different in depth from the image 910 displayed on the display 180.

Upon receipt of a content reception command, 3D objects 1942 to 1945 corresponding to data received from the external device are displayed with the illusion of 3D in FIG. 19(*f*). In addition, an object 1915 indicating that the data reception is in progress may be displayed on the display 180.

Figure 20:
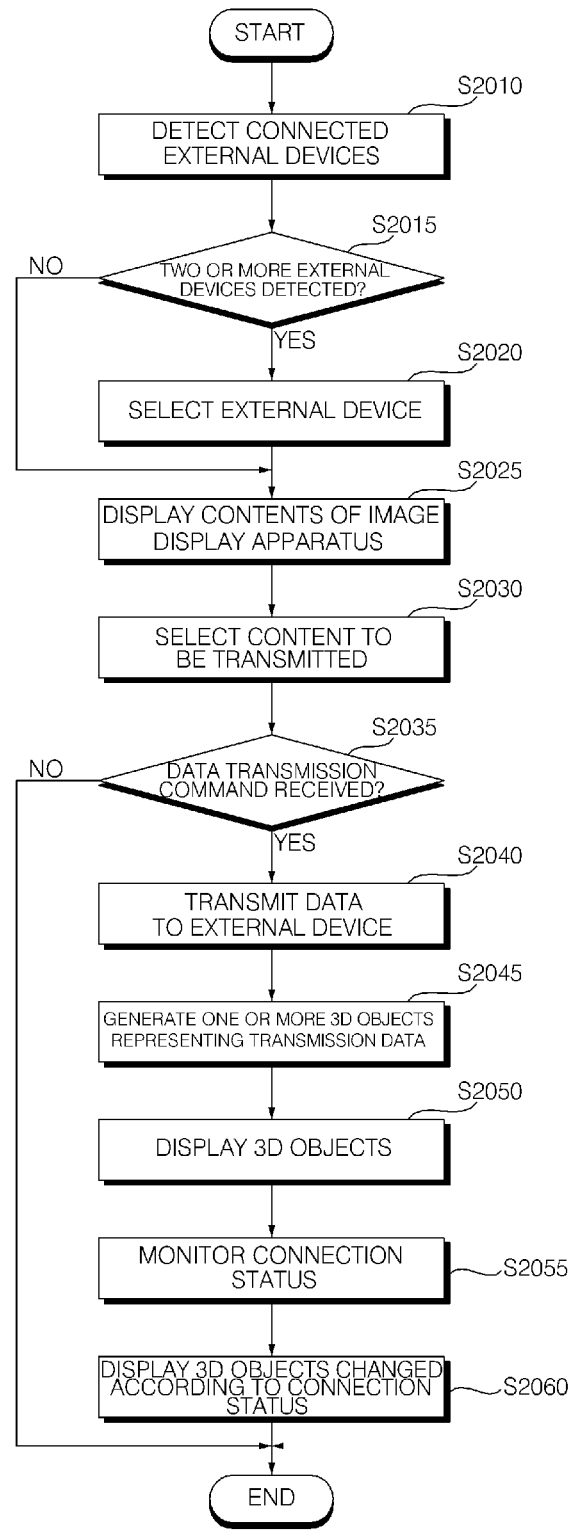
FIG. 20 is a flowchart illustrating a method for operating the image display apparatus according to another exemplary embodiment of the present invention.

FIG. 20 is a flowchart illustrating a method for operating the image display apparatus according to another exemplary embodiment of the present invention. The method for operating the image display apparatus is about displaying 3D objects corresponding to transmitted data, when the image display apparatus 100 transmits data to an external device. The flowchart illustrated in FIG. 20 is a counterpart of the flowchart illustrated in FIG. 8.

Referring to FIG. 20, connected external devices are detected in step S2010. The image display apparatus 100 may be connected to external devices wirelessly or non-wirelessly through the external signal I/O portion 130 illustrated in FIG. 1.

It is determined whether a plurality of connected external devices have been detected in step S2015. Upon detection of a plurality of connected external devices, at least one of the connected external devices may be selected by the remote control device 200, for example, in step S2020.

On the other hand, if only one connected external device has been detected in step S2015, the procedure may jump to step S2025.

In step S2025, contents that the image display apparatus 100 has are displayed. When a menu item "open" is selected from a management menu of the image display apparatus 100 displayed on the display 180, the contents of the image display apparatus 100 may be displayed. The management menu may be a pull-down menu or a pop-up menu. Also it is possible to configure the management menu as a sliding menu in such a manner that an image displayed on the display 180 disappears and the management menu appears in place of the disappearing image.

In step S2030, a content to be transmitted is selected. For example, while the contents of the image display apparatus are displayed by selecting the menu item "open", the content to be transmitted may be selected from among the displayed contents by a user gesture or an input from the remote control device 200. If a plurality of external devices have been detected, contents to be transmitted may be selected for the individual external devices Subsequently, it is determined whether a data transmission command has been received in step S2035. A command indicating whether to transmit the content from the image display apparatus 100 to the external device may be received.

Before reception of the data transmission command is monitored, the capacity, available capacity, etc. of a storage (not shown) in the external device may be notified to the user. For instance, an object indicating whether there is sufficient or insufficient storage capacity for storing the selected content in the external device may be displayed on the display 180. The user can determine whether to transmit the selected content to the external device, referring to this object.

Upon receipt of the data transmission command, data corresponding to the selected content is transmitted to the external device in step S2040. The transmitted data may include at least one of a still image file, a moving image file, an audio file, and a text file, for example. The data may be transmitted through the external signal I/O portion 130.

In step S2045, one or more 3D objects corresponding to the transmitted data are generated. The controller 170 is responsible for generating the 3D objects corresponding to the transmitted data. The 3D objects may be images corresponding to the transmitted data.

More specifically, the image processor 310 may process the transmitted data and the formatter 320 may generate the 3D objects corresponding to the transmitted data. During the 3D objects generation, the depth of the 3D objects corresponding to the transmitted data may be set to be different from the display 180 or an image displayed on the display 180.

The controller 170, particularly the formatter 320 may process the 3D objects corresponding to the transmitted data so that the 3D objects are displayed differently in at least one of size and depth according to the progress of the data transfer. The formatter 320 may scale up the 3D objects corresponding to the transmitted data at gradually increasing ratios or scale down the 3D objects corresponding to the transmitted data at gradually decreasing ratios according to the progress of the data transfer. In addition, the formatter 320 may set different depths for the 3D objects corresponding to the transmitted data so that the 3D objects corresponding to the transmitted data are getting deeper or less deep.

The formatter 320 may process the 3D objects corresponding to the transmitted data such that as a 3D object is deeper, the disparity between its left-eye and right-eye view 3D objects is narrower.

The left-eye and right-eye view 3D objects may be output in one of the formats illustrated in FIG. 5.

In step S2050, the 3D objects corresponding to the transmitted data are displayed under the control of the controller 170. Because the 3D objects corresponding to the transmitted data are processed to have a different depth from the image displayed on the display 180, for example, a positive depth, the 3D objects corresponding to the transmitted data are displayed, giving the illusion of 3D. Among the afore-described display schemes, a glass-type display scheme makes the 3D objects appear protruding to the user, when the user wears 3D glasses.

Especially, the 3D objects corresponding to the transmitted data are processed so that they are displayed differently in at least one of size and depth according to the progress of the data transfer. Accordingly, the user can intuitively recognize the progress of data transfer by the 3D objects corresponding to the transmitted data.

In step S2055, the connection status of the external device is monitored. The 3D objects corresponding to the transmitted data are displayed changed according to the connection status of the external device in step S2060.

The controller 170 may determine the connection status of the external device based on the strength of a signal received from or the amount of data received from the external device. Especially, the 3D objects corresponding to the transmitted data may be displayed changed according to a radio environment.

For example, the 3D objects corresponding to the transmitted data may be displayed with a change in at least one of size, brightness, transparency, color, and shaking, according to the connection status of the external device. 3D objects corresponding to data transmitted to a well-connected external device may be displayed brighter, whereas 3D objects corresponding to data transmitted to a poorly-connected external device may be displayed less bright or shaken. Therefore, the user can intuitively identify the connection status of the external device.

Meanwhile, if a plurality of external devices are selected in step S2020, data may be transmitted simultaneously or sequentially to the external devices. When the data transmission is simultaneous, 3D objects corresponding to the transmitted data may be displayed separately according to the external devices. Obviously, the 3D objects corresponding to the transmitted data are different in depth from the image displayed on the display 180.

For example, the 3D objects corresponding to the transmitted data may vary in at least one of display coordinates, size, brightness, transparency, color and shaking according to the external devices.

FIGS. 21 to 27 are views referred to for describing various examples of the method for operating the image display apparatus, illustrated in FIG. 20.

Figure 21:
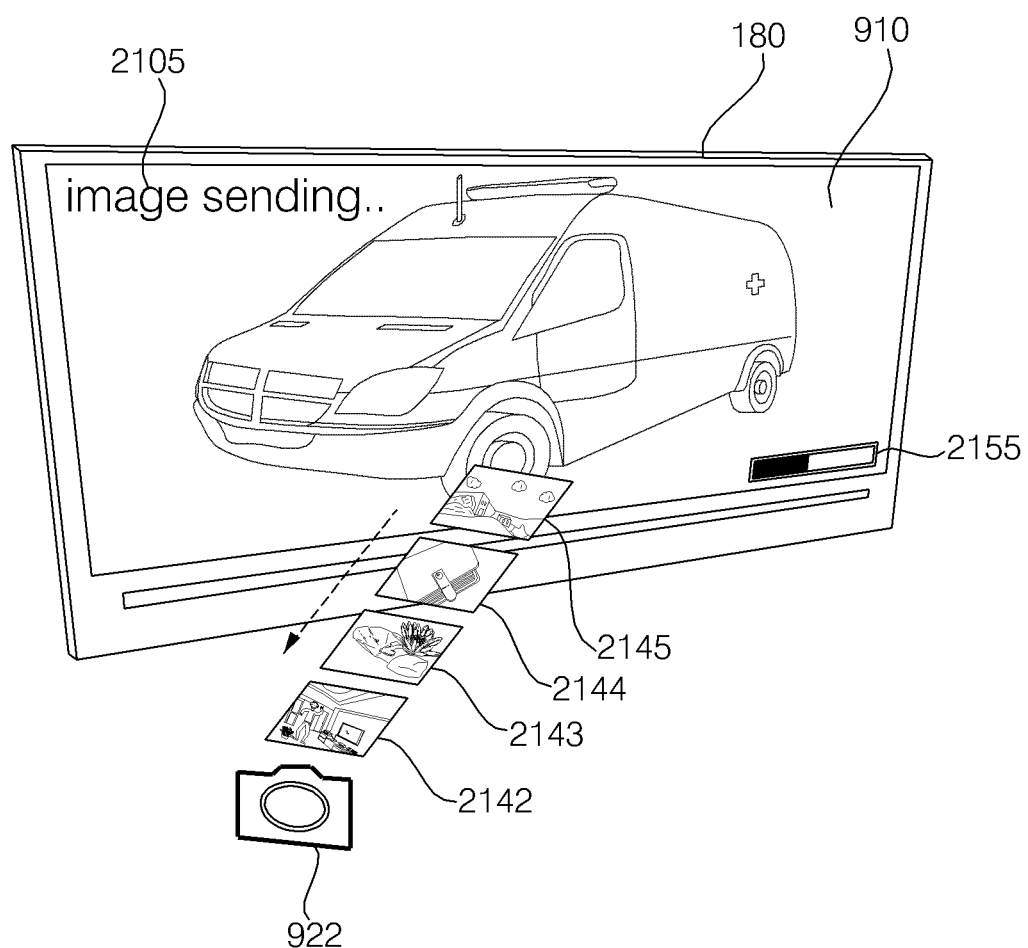
FIGS. 21 to 27E are views referred to for describing various examples of the method for operating the image display apparatus, illustrated in FIG. 20.

FIG. 21 is a counterpart of FIG. 9, illustrating three-dimensional displaying of 3D objects 2142 to 2145 corresponding to a still image file transmitted to a camera, with the image 910 displayed on the display 180. The 3D objects 2142 to 2145 are at a different depth from the image 910, for example, a positive depth. Hence, the 3D objects 2142 to 2145 may look protruding to the user.

An object 2105 indicating that the still image file transmission is in progress may be displayed on the display 180. Alternatively or additionally, an object indicating at least one of the transmission rate, transmitted amount, required time for transmission, transmission speed, transmission complete time, and remaining time for completed transmission of the still image file and an available storage capacity of the external device may be displayed. Among them, an object 2155 indicating the transmission rate of the still image file is displayed in FIG. 21, by way of example. Hence, the user can intuitively recognize the transmission state of the still image file.

Figure 22:
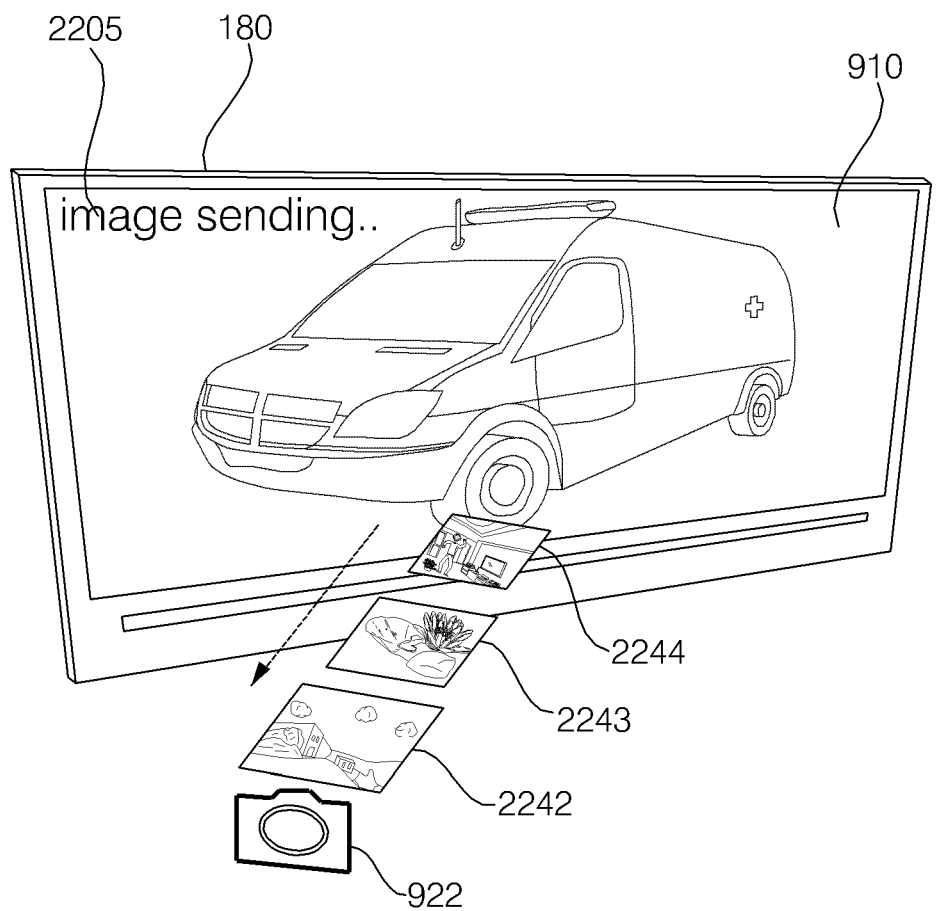

FIG. 22 is a counterpart of FIG. 11, illustrating displaying of a plurality of 3D objects corresponding to transmitted data, in different sizes. With the image 910 displayed on the display 180, 3D objects 2242, 2243 and 2244 corresponding to the still image file transmitted to the camera are displayed three-dimensionally in such a manner that as a 3D object is deeper, the 3D object is displayed larger. Because the 3D objects 2242, 2243 and 2244 are getting bigger toward the external device, the user can intuitively recognize the progress of the data transfer.

Figure 23:
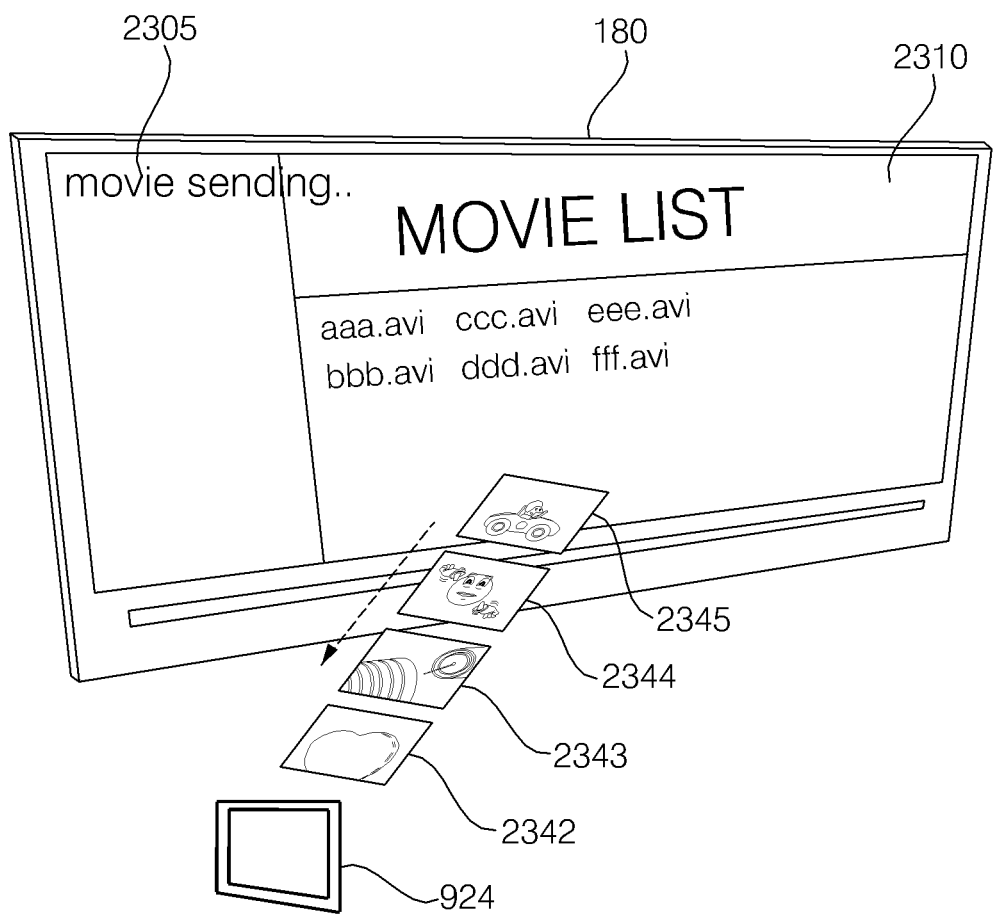

FIG. 23 is a counterpart of FIG. 13, illustrating three-dimensional displaying of 3D objects 2342 to 2345 corresponding to a moving image file transmitted to a PMP, with the image 910 displayed on the display 180. The 3D objects 2342 to 2345 are at a different depth from the image 910, for example, a positive depth. Hence, the 3D objects 2342 to 2345 may look protruding to the user.

The 3D objects 2342 to 2345 corresponding to the moving image file may be displayed as thumbnail images or thumbnail moving images. Herein, the 3D objects 2342 to 2345 take the form of thumbnail images.

An object 2305 indicating that the moving image file transmission is in progress may be displayed on the display 180. Alternatively or additionally, an object corresponding to the transmission rate of the moving image file may be displayed. Hence, the user can intuitively recognize the transmission state of the moving image file.

Figure 24:
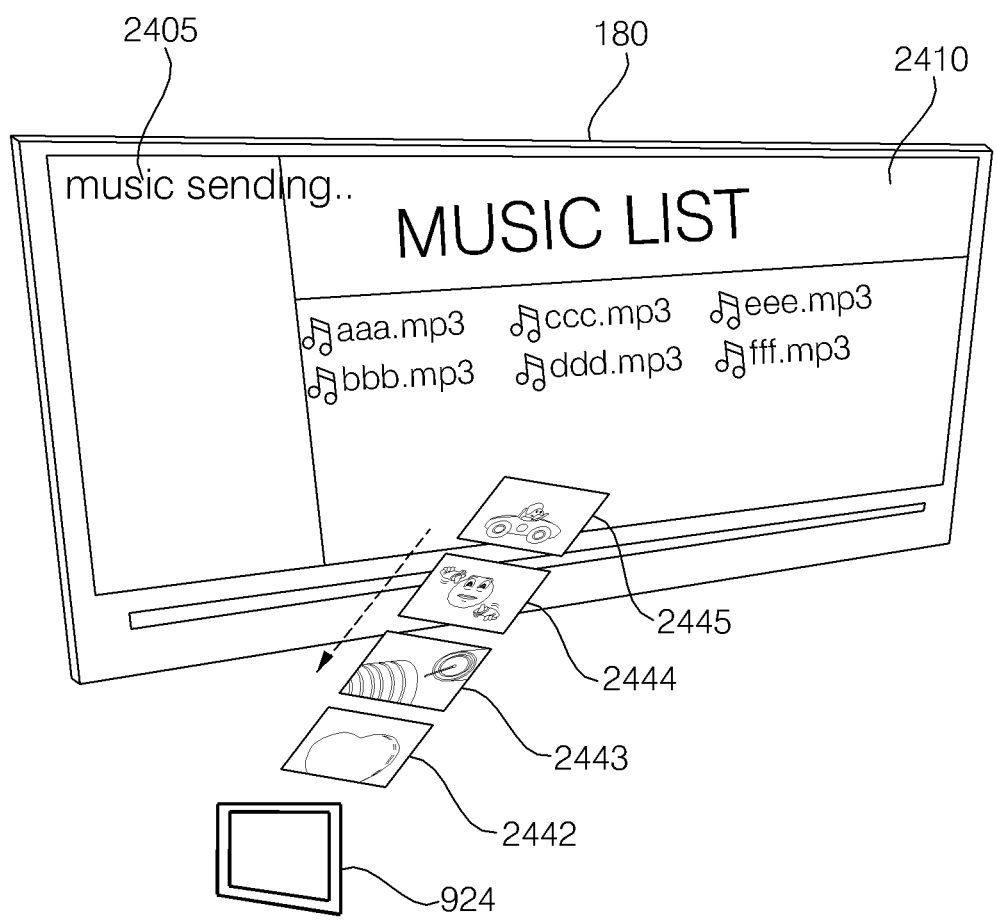

FIG. 24 is a counterpart of FIG. 14, illustrating three-dimensional displaying of 3D objects 2442 to 2445 corresponding to an audio file transmitted to the PMP, with an image 2410 displayed on the display 180. The 3D objects 2442 to 2445 are at a different depth from the image 2410, for example, a positive depth. Hence, the 3D objects 2442 to 2445 may look protruding to the user.

The 3D objects 2442 to 2445 corresponding to the audio file may be displayed as thumbnail images corresponding to the audio file.

An object 2405 indicating that the audio file transmission is in progress may be displayed on the display 180. Hence, the user can intuitively recognize the transmission state of the audio file.

Figure 25:
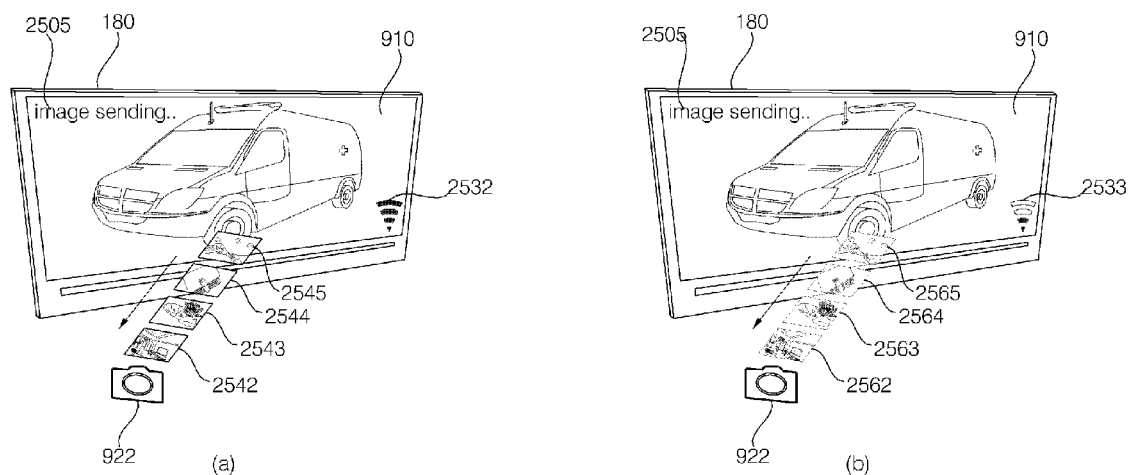

FIG. 25 is a counterpart of FIG. 16, illustrating displaying of 3D objects corresponding to data transmitted to an external device, with a change in at least one of size, brightness, transparency, color and shaking according to the connection status between the external device and the image display apparatus 100, while the image 910 is displayed on the display 180.

In a good radio environment, 3D objects 2542 to 2545 corresponding to data transmitted to the camera may be displayed clear as illustrated in FIG. 25(a), whereas in a poor radio environment, 3D objects 2562 to 2565 corresponding to data transmitted to the camera may be displayed dim as illustrated in FIG. 25(b). Wireless connection icons 2532 and 2533 corresponding to the radio environments may further be displayed on the display 180. The controller 170 may determine the connection status of the external device based on the strength of a radio signal transmitted to the external device.

Figure 26:
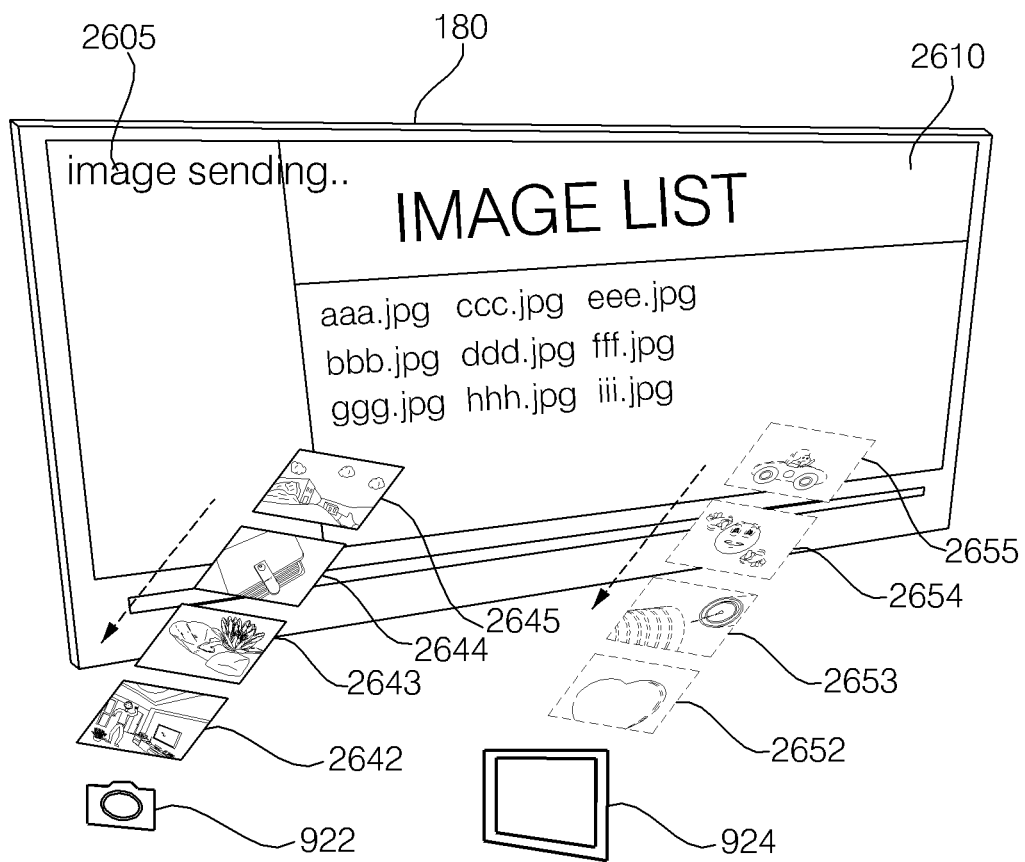

FIG. 26 is a counterpart of FIG. 18, illustrating separate displaying of 3D objects corresponding to data transmitted to a plurality of connected external devices, such that the 3D objects differ in at least one of size, brightness, transparency, and color according to the external devices corresponding to the 3D objects. Herein, the 3D objects have different transparency levels for the different external devices, by way of example.

Referring to FIG. 26, 3D objects 2642 to 2645 corresponding to data transmitted to the camera may be displayed clear, whereas 3D objects 2652 to 2655 corresponding to data transmitted to the PMP may be displayed dim. Accordingly, when transmitting data to a plurality of external devices, the user can intuitively identify the data transmissions to the external devices, separately.

FIG. 27 is a counterpart of FIG. 19, illustrating data transmission to an external device in the image display apparatus 100.

Figure 27A:
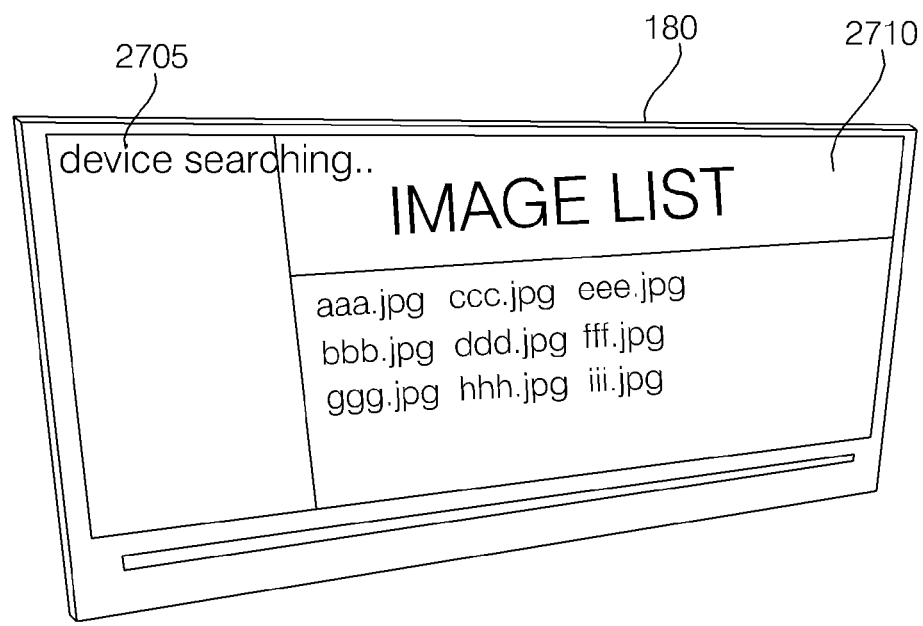
Figure 27B:
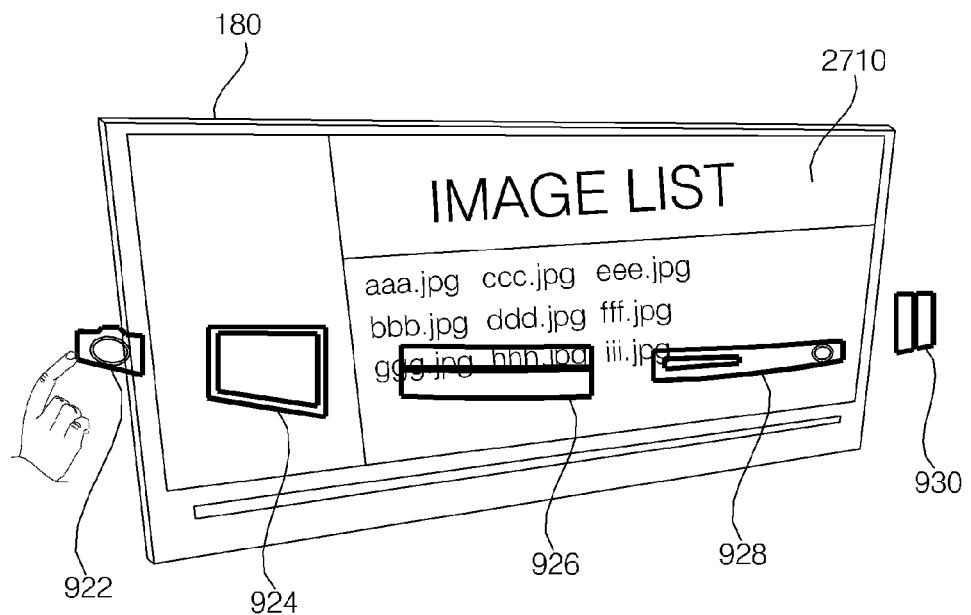
Figure 27C:
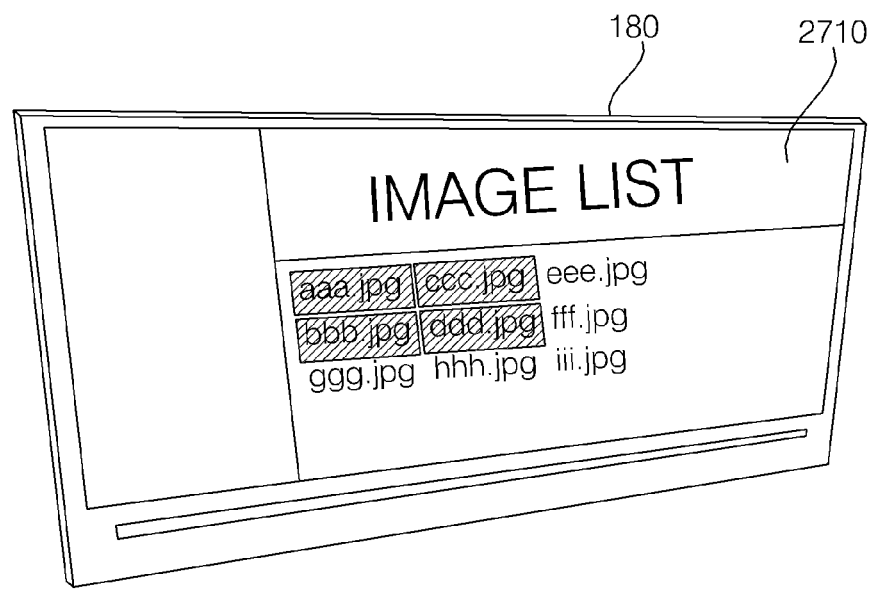
Figure 27D:
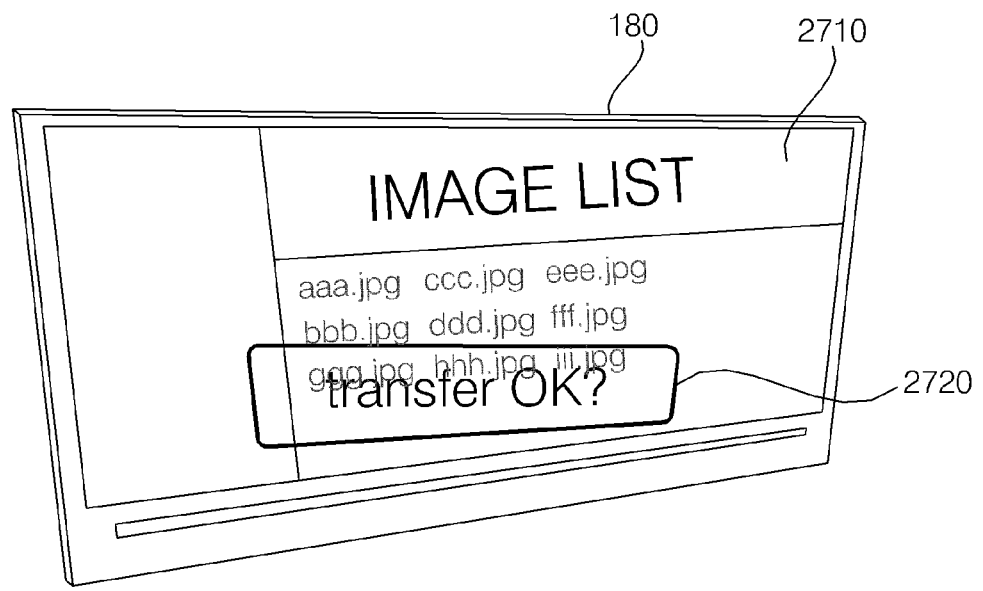
Figure 27E:
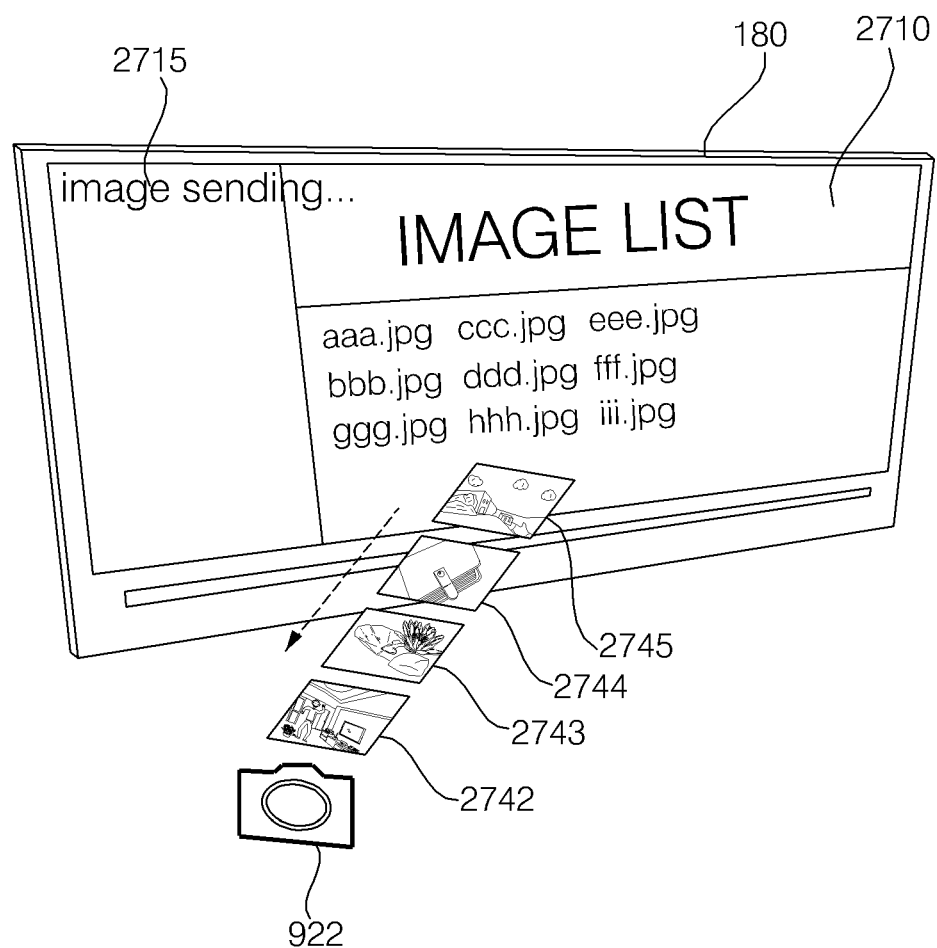

Referring to FIG. 27(a), the image display apparatus 100 searches for a connected external device, while the image 910 is displayed on the display 180. An object 2705 indicating that external devices are being searched may be displayed on the display 180.

Referring to FIG. 27(*b*), the controller 170 generates the 3D objects 922, 924, 926, 928 and 930 corresponding to the connected external devices according to the search results and displays them.

It is shown in FIG. 27(*b*) that as the image display apparatus 100 is connected to all of the camera, the PMP, the set-top box, the DVD player, and the game console, the 3D objects 922, 924, 926, 928 and 930 corresponding to these external devices are displayed.

The 3D objects 922, 924, 926, 928 and 930 are at different depths from the image 2710. Further, the 3D objects 922, 924, 926, 928 and 930 may look protruding to different degrees according to their depths.

As illustrated in FIG. 27(*c*), contents of the image display apparatus 100 may be displayed and a content to be transmitted to an external device may be selected from among the displayed contents.

Then the image display apparatus 100 receives a command indicating whether the selected content is to be transmitted. For example, an object 2720 "transfer OK?" may be displayed on the display 180 in FIG. 27(*d*). Hence, the user can enter a command indicating whether the content will be transmitted or not by making a gesture or manipulating the remote control device 200. The object 2720 may be a 3D object different in depth from the image 2710 displayed on the display 180.

Upon receipt of a content transmission command, 3D objects 2742 to 2745 corresponding to data transmitted to the external device are displayed with the illusion of 3D. In addition, an object 2715 indicating that the data transmission is in progress may be displayed on the display 180.

The image display apparatus and the operation method therefore according to the foregoing exemplary embodiments are not restricted to the exemplary embodiments set forth herein. Therefore, variations and combinations of the exemplary embodiments set forth herein may fall within the scope of the present invention.

The operation method of an image display apparatus according to the foregoing exemplary embodiments may be implemented as a code that can be written on a computer-readable recording medium and can thus be read by a processor. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that a computer-readable code is written thereto and executed therefrom in a decentralized manner. Functional programs, code, and code segments needed for realizing the embodiments herein can be construed by one of ordinary skill in the art.

According to one or more of the aforementioned exemplary embodiments, 3D objects corresponding to data transmitted to or received from an external device is processed to have a different depth from an image displayed on a display. Thus a user can view the objects corresponding to the transmitted or received data with the illusion of 3D.

Because 3D objects corresponding to data transmitted to or received from an external device are displayed differently in at least one of size and depth according to the progress of the data transmission or reception. Thus, the user can intuitively recognize the progress of the data transmission or reception.

3D objects corresponding to data transmitted to or received from an external device are displayed changed according to the connection status of the external device. Thus the user can intuitively recognize the progress of data transmission or reception.

When data is transmitted to or received from a plurality of external devices, objects corresponding to the transmitted or received data are displayed differently according to the external devices. Therefore, the user can intuitively identify the data transmissions or receptions to or from the external devices, separately.

Because a management menu of an external device is displayed as a 3D object, the user can easily manage and access the external device.

Therefore, the user can view 3D images corresponding to data transmitted between the image display apparatus and an external device, within a range that does not distract the user from an on-going image displayed on the display.

One or more embodiments described herein provide an image display apparatus and an operation method therefore, which increase user convenience.

One or more embodiments described herein also provide an apparatus and method for displaying an object corresponding to data transmitted to and received from an external device with the illusion of 3D.

According to one aspect, there is provided a method for operating an image display apparatus that receives a 3D image signal and displays the 3D image signal as a 3D image, which includes displaying an image, detecting a connected external device, receiving data from the detected external device, generating at least one 3D object corresponding to the received data, and displaying the at least one 3D object corresponding to the received data. The at least one 3D object corresponding to the received data is processed to have a different depth from the image.

According to another aspect, there is provided a method for operating an image display apparatus that receives a 3D image signal and displays the 3D image signal as a 3D image, which includes displaying an image, detecting a connected external device, transmitting data to the detected external device, generating at least one 3D object corresponding to the transmitted data, and displaying the at least one 3D object corresponding to the transmitted data. The at least one 3D object corresponding to the transmitted data is processed to have a different depth from the image.

According to a further aspect, there is provided an image display apparatus for receiving or transmitting a 3D image signal and displaying the 3D image signal as a 3D image, which includes a controller for outputting an image signal by processing an input signal, and generating at least one 3D object corresponding to data received from or transmitted to a connected external device, and a display for displaying the at least one 3D object corresponding to the transmitted or received data and an image corresponding to the image signal received from the controller. The at least one 3D object corresponding to the transmitted or received data is processed to have a different depth from the image.

The previous embodiments have identified the data exchanged between the display and external device as an image file, an audio file or a video file. However, embodiments are not limited to these types of data. For example, another example may include transferring data files (e.g., word processing, spreadsheets, etc) from a computer to a 3D display device.

Also, the previously described 3D objects may be thumbnails that correspond to actual data files that exchanged between the 3D image display apparatus and the external device. These 3D thumbnails may be still images or moving images (e.g., a mini-clip). The moving image 3D thumbnails may represent scenes or sub-sections of a movie file being exchanged between the 3D image display apparatus and the external device. If the file that is exchanged between the 3D image display apparatus and the external device is an audio file, the 3D thumbnail may be an image of the musician or another image or video thumbnail. If the file that is exchanged between the 3D image display apparatus and the external device is a data file (e.g., word processing, spreadsheets, etc), the 3D thumbnail may be an image of a part of the file or may be a predefined or user-selected default image.

If the displayed 3D objects are thumbnails of files that are exchanged, the thumbnails may be exchanged prior to the actual data exchange and stored in a memory. In one embodiment, multiple thumbnails may be preloaded from the external device (e.g., camera) into the 3D display device. As the actual files are exchanged, the thumbnails are shown to be moving toward the screen of the 3D display device. Thus, one or more completely transferred images may be shown on the screen of the 3D display device, while images corresponding to queued images are shown moving toward the screen. Or, a 3D thumbnail corresponding to an earlier transferred file may be shown closer to the screen than a 3D thumbnail corresponding to a later transferred file. Other variations in displaying 3D thumbnails corresponding to transferred, transferring and queued files may be employed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating a three-dimensional (3D) image display apparatus having a screen, the method comprising:
   displaying an image;
   exchanging data between the 3D image display apparatus and plural external devices;
   generating and simultaneously displaying, by the 3D image display apparatus, 3D objects at a depth different from the image, each of the 3D objects corresponding to a data exchange between the 3D image display apparatus and a respective one of the plural external devices,
   wherein the step of simultaneously displaying the 3D objects includes:
   simultaneously displaying a movement of each of the 3D objects relative to the screen, each movement representing a state of the data exchange between the 3D image display apparatus and the respective one of the plural external devices, and
   displaying other 3D objects corresponding to the plural external devices at a location farther away from the screen than the 3D objects corresponding to the data exchange between the 3D image display apparatus and the respective plural external devices; and
   the method further comprising one of:
   replacing one of the 3D objects with a corresponding 2D image on the screen when the corresponding data exchange is completed or when the one of the 3D objects has moved from the respective one of the plural external devices to a predetermined distance from the screen; and
   no longer displaying the 3D objects when the corresponding data exchange is completed or when the one of the 3D objects has moved from the screen to a predetermined distance to the respective one of the plural external devices.

2. The method of claim 1,
   wherein the movement is a movement toward the screen when the data exchange is a receipt of data by the display apparatus from the respective one of the plural external devices, and
   wherein the movement is a movement away from the screen when the data exchange is a receipt of data by the respective one of the plural external devices from the display apparatus.

3. The method of claim 1, wherein the step of simultaneously displaying the 3D objects comprises:
   displaying 3D objects closer to the screen larger than 3D objects farther from the screen.

4. The method of claim 1, wherein the step of simultaneously displaying the 3D objects includes varying an image quality of the 3D objects in correspondence with a corresponding data exchange signal quality.

5. The method of claim 1, wherein the data includes one of an image file, an audio file, a video file and a computer data file.

6. The method of claim 1, wherein the step of simultaneously displaying the 3D objects further comprises:
   displaying at least one other 3D object representing a data transfer status indicator and a data transfer quality indicator.

7. The method of claim 1, wherein each of the 3D objects is a thumbnail corresponding to the exchanged data.

8. The method of claim 7, wherein the thumbnail is one of a still image and a moving image.

9. The method of claim 1, wherein the state of the data exchange comprises a transfer queue position of data represented by a corresponding one of the 3D objects.

10. A 3D display device, comprising:
    a display module configured to display images on a screen;
    a controller operatively connected to the display module and configured to control the 3D display device to:
    display an image;
    exchange data between the 3D display device and plural external devices; and
    generate and simultaneously display, by the 3D display device, 3D objects at a depth different from the image, each of the 3D objects corresponding to a data exchange between the 3D display device and a respective one of the plural external devices, including:
    simultaneously displaying a movement of each of the 3D objects relative to the screen, each movement representing a state of the data exchange between the 3D display device and the respective one of the plural external devices, and
    displaying other 3D objects corresponding to the plural external devices at a location farther away from the screen than the 3D objects corresponding to the data exchange between the 3D display device and the respective plural external devices,
    wherein the controller is further configured to:
    replace one of the 3D objects with a corresponding 2D image on the screen when the corresponding data exchange is completed or when the one of the 3D objects has moved from the respective one of the plural external devices to a predetermined distance from the screen, or
    no longer display the 3D objects when the corresponding data exchange is completed or when the one of the 3D objects has moved from the screen to a predetermined distance to the respective one of the plural external devices.

11. The 3D display device of claim 10,
wherein the movement is a movement toward the screen when the data exchange is a receipt of data by the 3D display device from the respective one of the plural external devices, and
wherein the movement is a movement away from the screen when the data exchange is a receipt of data by the respective one of the plural external devices from the 3D display device.

12. The 3D display device of claim 10,
wherein the controller is configured to display 3D objects closer to the screen larger than 3D objects farther from the screen.

13. The 3D display device of claim 10, wherein the controller is configured to vary an image quality of the 3D objects in correspondence with a corresponding data exchange signal quality.

14. The 3D display device of claim 10, wherein the data includes one of an image file, an audio file, a video file and a computer data file.

15. The 3D display device of claim 10, wherein the controller is further configured to display at least one other 3D object representing a data transfer status indicator and a data transfer quality indicator while simultaneously displaying the 3D objects.

16. The 3D display device of claim 10, wherein each of the 3D objects is a thumbnail corresponding to the exchanged data.

17. The 3D display device of claim 16, wherein the thumbnail is one of a still image and a moving image.

18. The 3D display device of claim 10, wherein the state of the data exchange comprises a transfer queue position of data represented by a corresponding one of the 3D objects.

* * * * *